United States Patent
Hashimoto et al.

(10) Patent No.: US 7,710,066 B2
(45) Date of Patent: May 4, 2010

(54) MOTOR CONTROL DEVICE

(75) Inventors: Eiichiro Hashimoto, Kyoto (JP); Yoshio Tomigashi, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 365 days.

(21) Appl. No.: 11/822,208

(22) Filed: Jul. 3, 2007

(65) Prior Publication Data
US 2008/0018296 A1  Jan. 24, 2008

(30) Foreign Application Priority Data
Jul. 7, 2006  (JP) ............. 2006-187330

(51) Int. Cl.
*H02P 27/04* (2006.01)

(52) U.S. Cl. .............. 318/807; 318/808; 318/801; 318/802; 318/700; 318/400.01; 318/809

(58) Field of Classification Search .......... 318/807, 318/808, 801, 802, 700, 809, 400.01
See application file for complete search history.

(56) References Cited

U.S. PATENT DOCUMENTS 5,272,429 A * 12/1993 Lipo et al. ............. 318/808
5,936,378 A *  8/1999 Iijima et al. ............ 318/807

FOREIGN PATENT DOCUMENTS

| JP | 11-341864   | 12/1999 |
|----|-------------|---------|
| JP | 2003-174794 | 6/2003  |
| JP | 2003-339197 | 11/2003 |
| JP | 2004-056839 | 2/2004  |
| JP | 2005-117875 | 4/2005  |
| JP | 2005-253155 | 9/2005  |

* cited by examiner

*Primary Examiner*—Rita Leykin
(74) *Attorney, Agent, or Firm*—NDQ&M Watchstone LLP

(57) ABSTRACT

A motor control device that controls a permanent-magnet synchronous motor has: a magnetic flux controller that derives, as a specified excitation current value, a specified current value corresponding to a d-axis component of a current passing through an armature winding; and a current controller that controls, based on the specified excitation current value, the current passing through the armature winding. The magnetic flux controller makes the specified excitation current value vary periodically, based on an estimated or detected rotor position, in a current range in which the magnetic flux produced by the permanent magnet is weakened, and changes the specified excitation current value according to a rotation speed of the rotor.

10 Claims, 14 Drawing Sheets

MOTOR CONTROL DEVICE

This nonprovisional application claims priority under 35 U.S.C. §119(a) on Patent Application No. 2006-187330 filed in Japan on Jul. 7, 2006, the entire contents of which are hereby incorporated by reference.

BACKGROUND OF THE INVENTION

1. Field of the Invention

The present invention relates to motor control devices that drives and controls a motor, and more particularly to a motor control device that contributes to the reduction of vibration associated with the driving of the motor.

2. Description of Related Art

When permanent-magnet synchronous motors are used, it is necessary to use a technology for reducing vibration, including the radial vibration of the stator of the motor. The radial vibration of the stator is the vibration in the direction of the radius of the motor, which is caused by the magnetic attractive force exerted between the permanent magnet provided on the rotor of the motor and the stator. The radial vibration of the stator is transmitted to a frame (unillustrated) that holds the stator. This causes the frame to vibrate, resulting in the generation of noise. In particular, mechanical structural members such as the stator and the frame vibrate sympathetically at a particular rotation speed, causing strong vibration and noise. It is for this reason that reducing the radial vibration is of critical importance.

Accordingly, various methods have conventionally been proposed to reduce the vibration of the motor.

For example, a method has been proposed that reduces the vibration caused by torque pulsation by passing a d-axis current at regular intervals by referring to variations in the load torque.

There has also been proposed a method that reduces the vibration caused by cogging torque.

Additionally, there has been proposed a method that aims to reduce the vibration by superposing a harmonic on a multiphase alternating current.

As described above, reducing the radial vibration is of critical importance, and accordingly a method that can effectively reduce the radial vibration is keenly sought after. As well as reducing the radial vibration, reducing all the vibrations associated with the driving of the motor is an important goal to be achieved.

SUMMARY OF THE INVENTION

According to one aspect of the present invention, a motor control device controls a motor built with a rotor having a permanent magnet and a stator having an armature winding, and, let an axis parallel to a magnetic flux produced by the permanent magnet be called a d-axis, the motor control device is provided with: a magnetic flux controller that derives, as a specified excitation current value, a specified current value corresponding to a d-axis component of a current passing through the armature winding; and a current controller that controls, based on the specified excitation current value, the current passing through the armature winding. Here, the magnetic flux controller makes the specified excitation current value vary periodically, based on an estimated or detected rotor position, in a current range in which the magnetic flux is weakened, and changes the specified excitation current value according to a rotation speed of the rotor.

Specifically, for example, when the rotation speed is fixed at a given first rotation speed or a given second rotation speed different from the first rotation speed, the magnetic flux controller makes the specified excitation current value vary at a frequency proportional to the rotation speed, and the magnetic flux controller is so configured as to change a proportionality coefficient between the frequency and the rotation speed depending on whether the rotation speed is the first rotation speed or the second rotation speed.

Specifically, for example, the magnetic flux controller is so configured as to change the phase of variations in the specified excitation current value according to the rotation speed.

Specifically, for example, the magnetic flux controller is so configured as to change the amplitude of variations in the specified excitation current value according to the rotation speed.

For example, a plurality of possible proportionality coefficients are set for the proportionality coefficient, and the proportionality coefficient is determined based on vibration states of an apparatus incorporating the motor control device, the vibration states as observed when the plurality of possible proportionality coefficients are individually adopted as the proportionality coefficient.

For example, a plurality of possible phases are set for the phase, and the phase is determined based on vibration states of an apparatus incorporating the motor control device, the vibration states as observed when the plurality of possible phases are individually adopted as the phase.

According to another aspect of the present invention, a motor drive system is provided with: a motor; an inverter that drives the motor; and the motor control device that controls the motor by controlling the inverter.

For example, the motor drive system is used in a horizontal compressor.

The compressor inside which the motor is secured in such a way that a surface to which the compressor is fastened and the rotation axis of the rotor of the motor become parallel is referred to as a horizontal compressor. What is referred to as "parallel" does not only mean "parallel" in the strict sense of the word; it covers a broader concept including "practically parallel", which is somewhat deviated from the strict sense of the word.

DETAILED DESCRIPTION OF PREFERRED EMBODIMENTS

Hereinafter, the present invention will be described by way of specific embodiments with reference to the accompanying drawings. Among these drawings, such parts that appear more than once are identified with common reference designations, and in principle the description of any part, once given, will not be repeated.

First Embodiment

Figure 1:
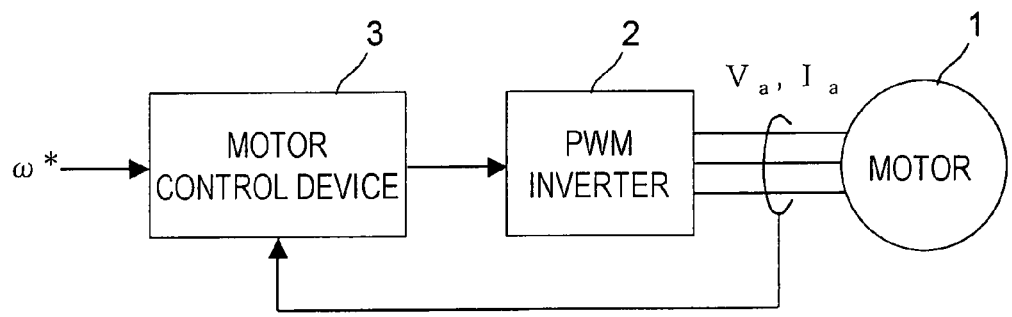
FIG. 1 is a block diagram showing an outline of the configuration of a motor drive system as a first embodiment of the present invention.

FIG. 1 is a block configuration diagram of a motor drive system according to the first embodiment of the invention. The reference numeral 1 represents a three-phase permanent-magnet synchronous motor (hereinafter simply the "motor 1") having a permanent magnet on a rotor (unillustrated) and having an armature winding on a stator (unillustrated).

The reference numeral 2 represents a PWM (pulse width modulation) inverter that, according to the rotor position of the motor 1, supplies three-phase alternating-current voltages, consisting of U-phase, V-phase, and W-phase voltages, to the motor 1. These voltages supplied to the motor 1 are collectively referred to as the motor voltage (armature voltage) $V_a$, and the currents supplied from the PWM inverter 2 to the motor 1 are collectively referred to as the motor current (armature current) $I_a$.

The reference numeral 3 represents a motor control device that, based on the motor current $I_a$, estimates the rotor position or the like of the motor 1, and feeds the PWM inverter 2 with a signal for rotating the motor 1 at a desired rotation speed. This desired rotation speed is fed, in the form of a specified motor speed value $\omega^*$, from an unillustrated CPU (central processing unit) or the like to the motor control device 3.

Figure 2:
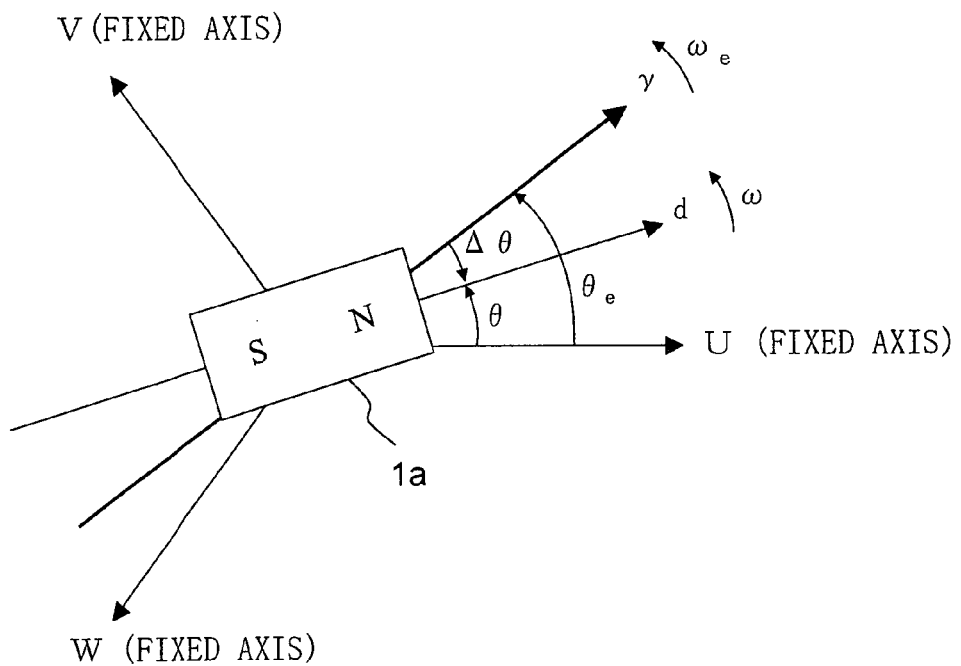
FIG. 2 is an analysis model diagram of the motor in the first embodiment of the present invention.

FIG. 2 is an analysis model diagram of the motor 1. In the following description, what is referred to simply by the "armature winding" should be understood to mean the armature winding provided on the motor 1. FIG. 2 shows the U-phase, V-phase, and W-phase armature winding fixed axes. The reference numeral 1a represents the permanent magnet constituting the rotor of the motor 1. In a rotating coordinate system that rotates at the same speed as the magnetic flux produced by the permanent magnet 1a, the direction of the magnetic flux produced by the permanent magnet 1a is referred to as the d-axis, and the axis estimated, for control purposes, as corresponding to the d-axis is referred to as the γ-axis. Moreover, although unillustrated, the axis having a phase leading the d-axis by an electrical angle of 90 degrees is referred to as the q-axis, and the axis estimated to have a phase leading the γ-axis by an electrical angle of 90 degrees is referred to as the δ-axis. The coordinate axes of the rotating coordinate system having the d- and q-axes as its coordinate axes are called the d-q axes (real axes). The rotating coordinate system (estimated rotating coordinate system) estimated for control purposes has the γ- and δ-axes as its coordinate axes, and its coordinate axes are called the γ-δ axes.

The d-q axes rotates, and its rotation speed (electrical angular velocity) is called the real motor speed $\omega$. The γ-δ axes also rotates, and its rotation speed (electrical angular velocity) is called the estimated motor speed $\omega_e$. With respect to the d-q axes in rotation, the phase of the d-axis at a given moment is represented, relative to the U-phase armature winding fixed axis, by θ (real rotor position θ). Likewise, with respect to the γ-δ axes in rotation, the phase of the γ-axis at that given moment is represented, relative to the U-phase armature winding fixed axis, by $θ_e$ (estimated rotor position $θ_e$). Then, the axis error Δθ between the d- and γ-axes (the axis error Δθ between the d-q axes and the γ-δ axes) is given by $Δθ = θ − θ_e$.

In the following description, the γ-axis, δ-axis, d-axis, and q-axis components of the motor voltage $V_a$ are referred to as the γ-axis voltage $v_γ$, δ-axis voltage $v_δ$, d-axis voltage $v_d$, and q-axis voltage $v_q$ respectively; the γ-axis, δ-axis, d-axis, and q-axis components of the motor current $I_a$ are referred to as the γ-axis current $i_γ$, δ-axis current $i_δ$, d-axis current $i_d$, and q-axis current $i_q$ respectively.

Moreover, in the following description, $R_a$ represents the motor resistance (the resistance of the armature winding of the motor 1); $L_d$ and $L_q$ respectively represent the d-axis and q-axis inductances (the d-axis and q-axis components of the inductance of the armature winding of the motor 1); $Φ_a$ represents the armature flux linkage ascribable to the permanent magnet 1a. The values of $L_d$, $L_q$, $R_a$, and $Φ_a$ are determined at the time of the fabrication of the motor drive system, and are used by the motor control device to perform calculations. In the formulae presented in the course of the following description, s represents the Laplace operator.

Figure 3A:
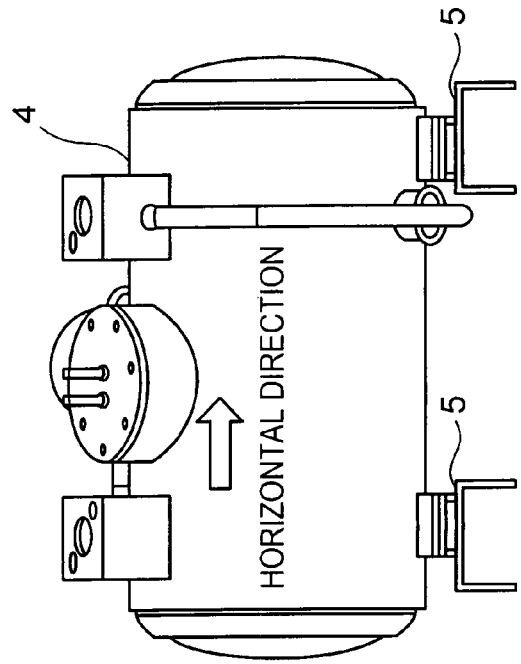
FIG. 3A is a front view of a horizontal compressor incorporating the motor drive system shown in FIG. 1.
Figure 3B:
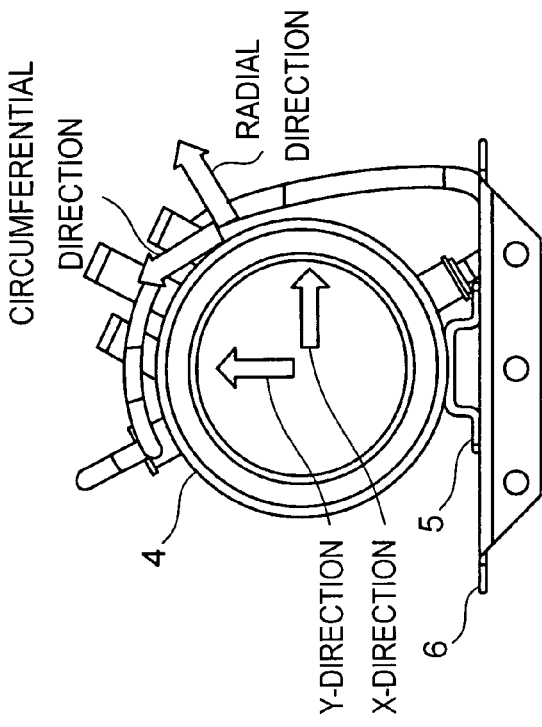
FIG. 3B is a side view of the horizontal compressor incorporating the motor drive system shown in FIG. 1.

This embodiment assumes that the motor drive system shown in FIG. 1 is incorporated in a horizontal compressor. FIG. 3A is a front view of a horizontal compressor 4 incorporating the motor drive system shown in FIG. 1, and FIG. 3B is a side view of the horizontal compressor 4. In FIG. 3A, the reference numeral 6 represents an installation surface on which the horizontal compressor 4 is placed.

The horizontal compressor 4 is provided with fastenings 5 for fastening the horizontal compressor 4 to the installation surface 6. These fastenings 5 and the installation surface 6 are joined with fastening devices (unillustrated) such as bolts, whereby the horizontal compressor 4 is fastened to the installation surface 6.

The motor 1 shown in FIG. 1 is secured inside the horizontal compressor 4 shown in FIGS. 3A and 3B (how the motor 1 is secured is not shown here) in such a way that the rotation axis of the rotor of the motor 1 lies parallel to the installation surface 6. The compressor inside which the rotation axis of the rotor of the motor 1 lies parallel to the installation surface 6 is referred to as a horizontal compressor. What is referred to as "parallel" does not only mean "parallel" in the strict sense of the word; it covers a broader concept including "practically parallel", which is somewhat deviated from the strict sense of the word.

Now, suppose that the installation surface 6 is horizontal with respect to the ground. Then, the rotation axis of the rotor of the motor 1 is horizontal, and is assumed to point in the direction along the longer sides of the horizontal compressor 4. Hereinafter, the direction parallel to the rotation axis is referred to as the "horizontal direction". Moreover, suppose that there is a three linear coordinate axes, consisting of the X-, Y-, and Z-axes, and that the Z-axis is parallel to the horizontal direction just mentioned above. Then, the X-, Y-, and Z-axes define three-dimensional rectangular coordinates. Hereinafter, the directions parallel to the X- and Y-axes are referred to as the X-direction and Y-direction respectively. The Y-direction is vertical to the installation surface 6; the X-direction is parallel to the installation surface 6. Incidentally, the horizontal direction is orthogonal to the X- and Y-directions.

Furthermore, in the two-dimensional plane defined by the X- and Y-axes, let the origin of the two-dimensional plane be located on the rotation axis of the motor 1. Then, in the two-dimensional plane, the direction of the straight line passing through the origin is referred to as the radial direction, which is the same as the direction of the radius of the locus of the rotating rotor of the motor 1. In particular, in this embodiment, as shown in FIG. 3A, the direction that is not parallel to both the X- and Y-directions is referred to as the radial direction. Moreover, in the two-dimensional plane defined by the X- and Y-axes, the direction orthogonal to the radial direction is referred to as the circumferential direction. This circumferential direction is the same as the tangential direction of the locus of the rotating rotor of the motor 1.

The magnetic attractive force exerted in the radial direction between the permanent magnet 1a on the rotor and the stator causes the radial vibration of the stator, which is transmitted to a frame (unillustrated) that holds the stator. This causes the horizontal compressor 4 to vibrate, resulting in the generation of noise.

Incidentally, in typical motor driving control, a negative d-axis current is passed when a reluctance torque is used, or flux-weakening control is performed. In general, at a rotation speed at which, if no negative d-axis current is passed, the terminal voltage of the motor exceeds a predetermined upper voltage limit, flux-weakening control is performed. Passing the d-axis current more than necessary is undesirable because it will result in the reduction in efficiency. It is for this reason that usually the d-axis current that is equal to or greater than the d-axis current that achieves maximum torque control is not passed, or, at a rotation speed at which the terminal voltage is lower than the upper voltage limit, flux-weakening control is not performed.

In this embodiment, unlike the conventional methods, in the speed range in which the terminal voltage of the motor 1 is equal to or lower than a predetermined upper voltage limit without passing the negative d-axis current, that is, in the speed range in which flux-weakening control is not conventionally performed, the negative d-axis current is passed deliberately so as to weaken the magnetic flux (armature flux linkage) produced by the permanent magnet 1a. When passing the negative d-axis current, how it is fed is changed appropriately according to the rotation speed of the rotor.

It is to be noted that the terminal voltage of the motor 1 is the voltage applied to the armature winding of the motor 1 by the PWM inverter 2. The above-mentioned upper voltage limit is set based on the power supply voltage supplied to the inverter 2, and the speed range described above is the speed range of the rotation speed of the rotor of the motor 1.

Figure 4:
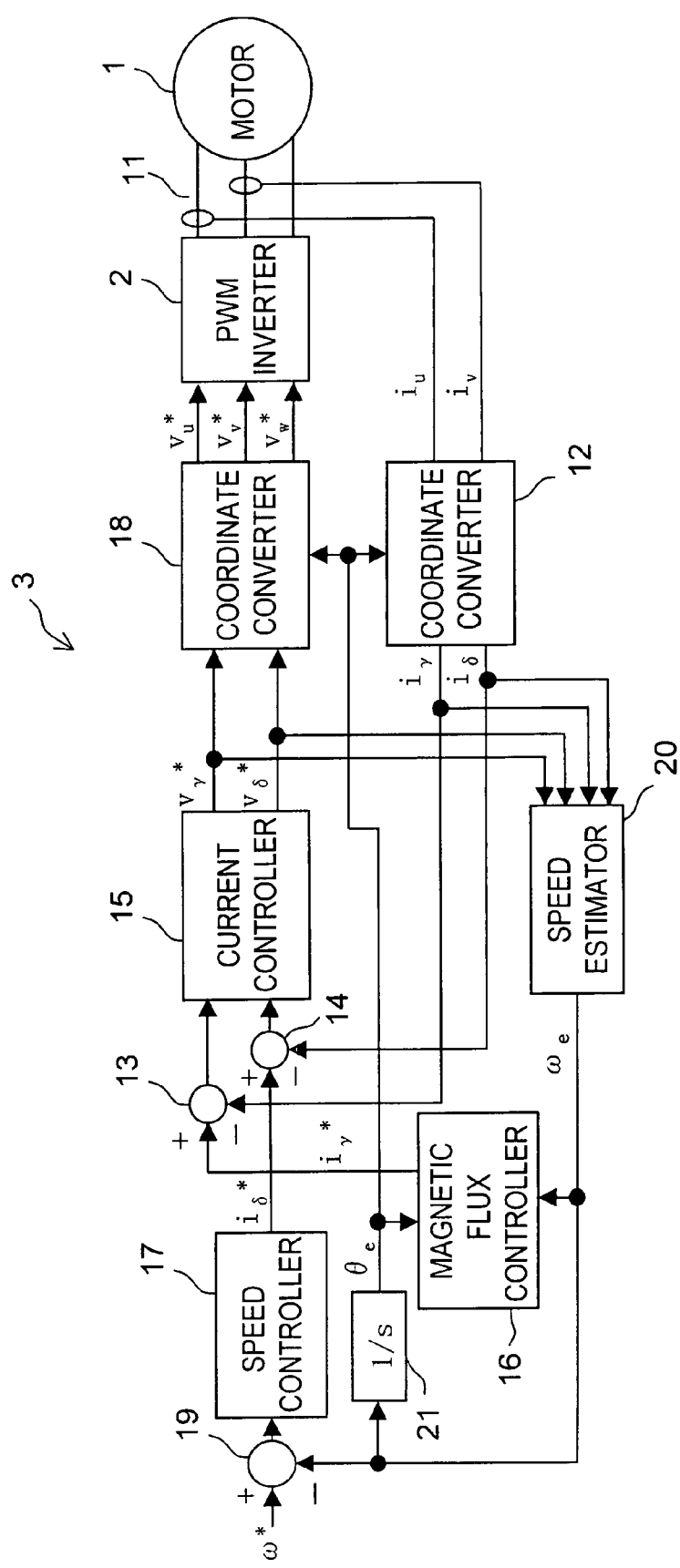
FIG. 4 is a configuration block diagram of the motor drive system shown in FIG. 1.

The configuration and operation of the motor drive system of this embodiment will be described more specifically. FIG. 4 is a configuration block diagram of the motor drive system, and shows the specific internal configuration of the motor control device 3 shown in FIG. 1. The motor control device 3 includes a current detector 11, a coordinate converter 12, a subtracter 13, a subtracter 14, a current controller 15, a magnetic flux controller 16, a speed controller 17, a coordinate converter 18, a subtracter 19, a speed estimator 20, and an integrator 21. The different parts constituting the motor control device 3 can freely use all the values produced within the motor control device 3 as necessary.

The current detector 11 is realized with, for example, Hall devices or the like, and detects the U-phase current $i_u$ and the V-phase current $i_v$, which are fixed-axis components of the motor current $I_a$ supplied from the PWM inverter 2 to the motor 1. The coordinate converter 12 receives the U-phase current $i_u$ and V-phase current $i_v$ detected by the current detector 11, and converts them into two-phase currents, namely the γ-axis current $i_\gamma$ and δ-axis current $i_\delta$, based on the estimated rotor position $\theta_e$ fed from the integrator 21 that functions as a position estimator.

The speed estimator 20 estimates and outputs the estimated motor speed $\omega_e$. The method by which the estimated motor speed $\omega_e$ is estimated will be described later. The integrator 21 integrates the estimated motor speed $\omega_e$ outputted from the speed estimator 20, and thereby calculates the estimated rotor position $\theta_e$.

The subtracter 19 subtracts from the specified motor speed value $\omega^*$ the estimated motor speed $\omega_e$ fed from the speed estimator 20, and outputs the result of the subtraction (speed error). The speed controller 17, based on the subtraction result $(\omega^* - \omega_e)$ from the subtracter 19, produces and outputs the specified δ-axis current value $i_\delta^*$. This specified δ-axis current value (specified torque current value) $i_\delta^*$ represents the current value to be followed by the δ-axis current $i_\delta$, which is the δ-axis component of the motor current $I_a$. The magnetic flux controller 16 produces the specified γ-axis current value $i_\gamma^*$ based on the estimated rotor position $\theta_e$ fed from the integrator 21 and the estimated motor speed $\omega_e$ fed from the speed estimator 20, and outputs it. This specified γ-axis current value (specified excitation current value) $i_\gamma^*$ represents the current value to be followed by the γ-axis current $i_\gamma$, which is the γ-axis component of the motor current $I_a$.

The subtracter 13 subtracts the γ-axis current $i_\gamma$ from the specified γ-axis current value $i_\gamma^*$, and thereby calculates the current error $(i_{65}^* - i_\gamma)$. The subtracter 14 subtracts the γ-axis current $i_\delta$ from the specified δ-axis current value $i_\delta^*$, and thereby calculates the current error ($i_\delta^* - i_\delta$).

The current controller 15 receives the current errors calculated by the subtracters 13 and 14, and thereby produces, by proportional-plus-integral control, the specified γ-axis voltage value $v_\gamma^*$ and the specified δ-axis voltage value $v_\delta^*$ such that the γ-axis current $i_\gamma$ follows the specified γ-axis current value $i_\gamma^*$ and in addition that the δ-axis current $i_\delta$ follows the specified δ-axis current value $i_\delta^*$, and outputs them; meanwhile, as necessary, $i_\gamma$, $i_\delta$, and $\omega_e$ are referred to. The specified γ-axis voltage value $v_\gamma^*$ represents the voltage value to be followed by the γ-axis voltage $v_\gamma$, and the specified δ-axis voltage value $v_\delta^*$ represents the voltage value to be followed by the δ-axis voltage $v_\delta$.

Based on the estimated rotor position $\theta_e$ fed from the integrator 21, the coordinate converter 18 converts the two-phase specified voltage values, namely the specified γ-axis voltage value $v_\gamma^*$ and specified δ-axis voltage value $v_\delta^*$ into specified three-phase voltage values consisting of a specified U-phase voltage value $v_u^*$, a specified V-phase voltage value $v_v^*$, and a specified W-phase voltage value $v_w^*$, and then outputs them to the PWM inverter 2.

Based on the specified three-phase voltage values ($v_u^*$, $v_v^*$, and $v_w^*$), which represent the voltages to be applied to the motor 1, the PWM inverter 2 produces pulse-width-modulated signals, and supplies the motor current $I_a$ commensurate with the specified three-phase voltage values to the motor 1 to drive it.

Figure 5:
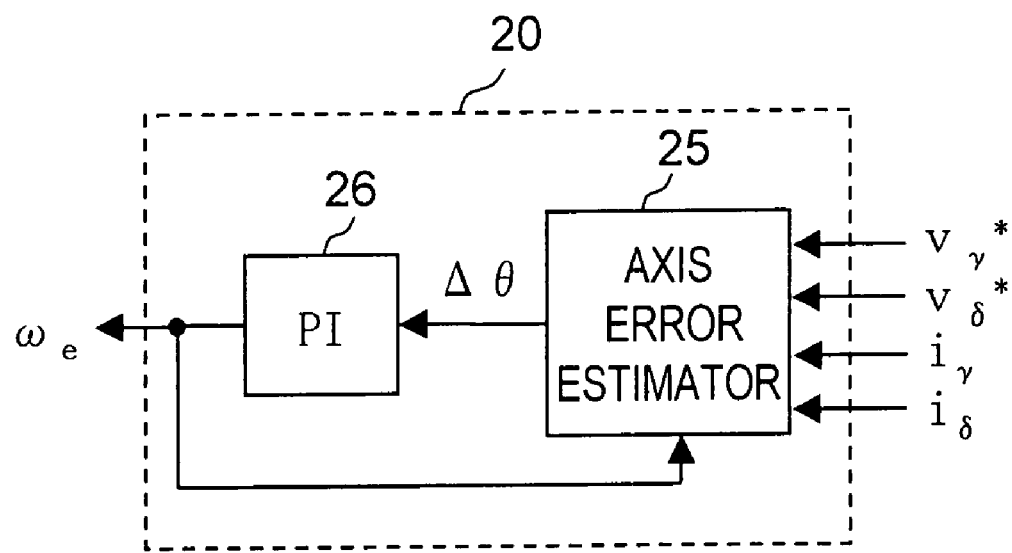
FIG. 5 is an internal block diagram of the speed estimator shown in FIG. 4.

FIG. 5 shows the internal blocks of the speed estimator 20. With reference thereto, an example of the method by which the estimated motor speed $\omega_e$ is estimated by the speed estimator 20 will be described. There have conventionally been proposed various methods for estimating the estimated motor speed $\omega_e$, and any method other than specifically described below can be adopted in the speed estimator 20.

The speed estimator 20 shown in FIG. 5 includes an axis error estimator 25 and a proportional-plus-integral calculator 26. The axis error estimator 25 calculates the axis error Δθ between the d-axis and the γ-axis by using, for example, formula (1) below. In formula (1), p represents the differential operator. When formula (1) is used, the values of $v_\gamma^*$, $v_\delta^*$, and $\omega_e$ are used as the values of $v_\gamma$, $v_\delta$, and ω in formula (1). The axis error estimator 25 is fed with the values of $v_\gamma^*$, $v_\delta^*$, $i_\gamma$, and $i_\delta$ from the current controller 15 and the coordinate converter 12, and is fed with the value of $\omega_e$ from the proportional-plus-integral calculator 26.

$$\Delta\theta = \tan^{-1}\frac{-(v_\gamma - (R_a + pL_d)i_\gamma + \omega L_q i_\delta)}{v_\delta - (R_a + pL_d)i_\delta - \omega L_q i_\gamma} \quad (1)$$

$$\approx -\frac{v_\gamma - (R_a + pL_d)i_\gamma + \omega L_q i_\delta}{v_\delta - (R_a + pL_d)i_\delta - \omega L_q i_\gamma}$$

To achieve PLL (phase locked loop) control, the proportional-plus-integral calculator 26, cooperating with the different parts constituting the motor control device 3, performs proportional-plus-integral control to calculate the estimated motor speed $\omega_e$ such that the axis error Δθ calculated by the axis error estimator 25 converges to zero. The estimated motor speed $\omega_e$ thus calculated is fed, as the value outputted from the speed estimator 20, to the different parts of the motor control device 3 that need it.

Next, the magnetic flux controller 16, which is one of the distinctive features of the motor drive system of this embodiment, will be described. The following description assumes that the number of pole pairs of the motor 1 is two. Needless to say, the number of pole pairs does not necessarily have to be two, but any number of pole pairs may be used.

Now, the value $i_{ref}^*$ on which the specified γ-axis current value $i_\gamma^*$ is based is defined by formula (2) below.

$$i_{ref}^* = A\cos(n \times \omega_e t + \alpha) \quad (2)$$
$$= A\cos(n \times \theta_e + \alpha)$$

Then, $i_\gamma^*$ is so produced as to fulfill formulae (3a) and (3b). That is, $i_\gamma^* = i_{ref}^*$ when $i_{ref}^*$ given by formula (2) is less than zero; $i_\gamma^*$ equals zero when $i_{ref}^*$ is equal to or greater than zero.

$$i_\gamma^* = i_{ref}^* \text{(when } i_{ref}^* < 0) \quad (3a)$$

$$i_\gamma^* = 0 \text{(when } i_{ref}^* \geq 0) \quad (3b)$$

In formula (2), "A" represents the gain that determines the amplitude of the variations in $i_\gamma^*$ and $i_{ref}^*$; n represents the value that determines the frequency of the variations; and α represents the phase of the variations. Here, t represents time. It is assumed that "A" is positive.

Here, a supplementary explanation will be given of the relationship among the mechanical angular velocity $\omega_m$ of the rotor of the motor 1, the electrical angular velocity $\omega_e$ that appears in formula (2) or the like, and the number of pole pairs Np. As is well-known, the equation $\omega_m = \omega_e/Np$ holds. Thus, let the mechanical period be Tm ($=2\pi/\omega_m$) and the electrical period be Te ($=2\pi/\omega_e$), then the equation Tm=Te×Np holds.

Since n in formula (2) is a coefficient associated with the electrical angular velocity, when n=1, 2, 3, ..., the harmonics of order 1, 2, 3, ... appear in the electrical period (Te). On the other hand, since Np=2, when n=1, 2, 3, ..., the harmonics of order 2, 4, 6, ... appear in the mechanical period (Tm). Hence, let the order of the harmonic with respect to the mechanical angle be $k_1$ ($k_1$ is a natural number), then n=$k_1$/Np holds.

Figure 6:
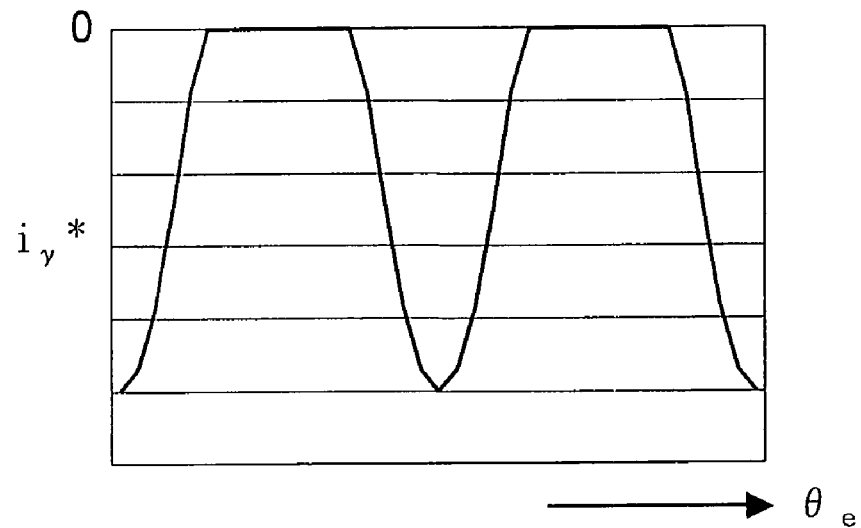
FIG. 6 is a waveform diagram showing the specified γ-axis current value produced by the magnetic flux controller shown in FIG. 4.

FIG. 6 shows how the specified γ-axis current value $i_\gamma^*$ varies according to the estimated rotor position $\omega_e$. As will be understood from the above-described definitions or the like, the specified γ-axis current value $i_\gamma^*$ produces a waveform in the form of the negative half of the cosine waveform, and varies periodically in the current range in which the magnetic flux produced by the permanent magnet 1a is weakened.

In this embodiment, $i_{65}^*$ and $i_{ref}^*$ are varied at a speed $k_1$ times of the mechanical rotation speed (expressed in revolution per second (rps)) of the rotor, that is, at a frequency ($k_1$/Np) times of $\omega_e$, which is the fundamental frequency of $i_\gamma^*$ and $i_{ref}^*$. Let the order of the d-axis current injected into the motor 1 when $k_1$=1, 2, 3, 4, ... be called the first, second, third, fourth, ... order. When $k_1$=1, 2, 3, 4, ..., one, two, three, four, ... periods worth of variations in the d-axis current respectively appear every time the rotor is rotating one-turn.

Figure 7:
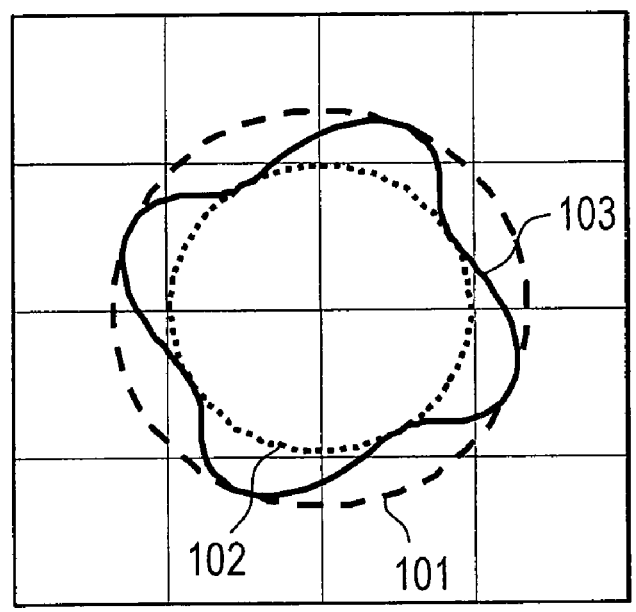
FIG. 7 is a diagram showing the loci of the magnetic attractive forces in the fixed coordinate system, the magnetic attractive forces being associated with the motor shown in FIG. 1.

FIG. 7 shows the loci of the magnetic attractive forces in the fixed coordinate system. In FIG. 7, a curve 101 represents the magnetic attractive force in the radial direction when vector control is performed such that the d-axis current $i_d$ is kept equal to zero, whereas a curve 102 represents the magnetic attractive force in the radial direction when flux-weakening control is performed such that $i_d$ is kept at a given value (gain A).

A curve 103, which corresponds to this embodiment, represents the locus of the magnetic attractive force in the radial direction when the d-axis current of fourth order (harmonic d-axis current) is injected. When the d-axis current of fourth order is injected (that is, when n=2), four periods worth of variations in $i_\gamma^*$ and $i_{ref}^*$ appear every time the rotor is mechanically rotating one-turn. Accordingly, while the rotor is mechanically rotating one-turn, the magnetic attractive force in the radial direction becomes alternately stronger and weaker four times due to the variations in $i_\gamma{}^*$.

As described above, periodic variations in $i_\gamma{}^*$ ($i_d$) make the magnetic attractive force stronger and weaker periodically. This results in the appearance of a mechanical vibration component in the radial direction. The motor drive system of this embodiment exploits this vibration component to cancel out the vibration (mechanical vibration) of the motor 1 in the radial direction, and thereby achieves the reduction in vibration.

FIGS. 8 to 11 are diagrams each showing the dependence of the vibration level indicating the magnitude of the vibration of the horizontal compressor 4 on the rotation speed. FIGS. 8 to 11 each show the results of the experiments in which the gain A and the phase α are kept at a constant gain $A_0$ and a certain phase $\alpha_0$ respectively. As will be specifically described later, based on the results of the experiments, the magnetic flux controller 16 shown in FIG. 4 determines $i_\gamma{}^*$ to be actually outputted.

Figure 8:
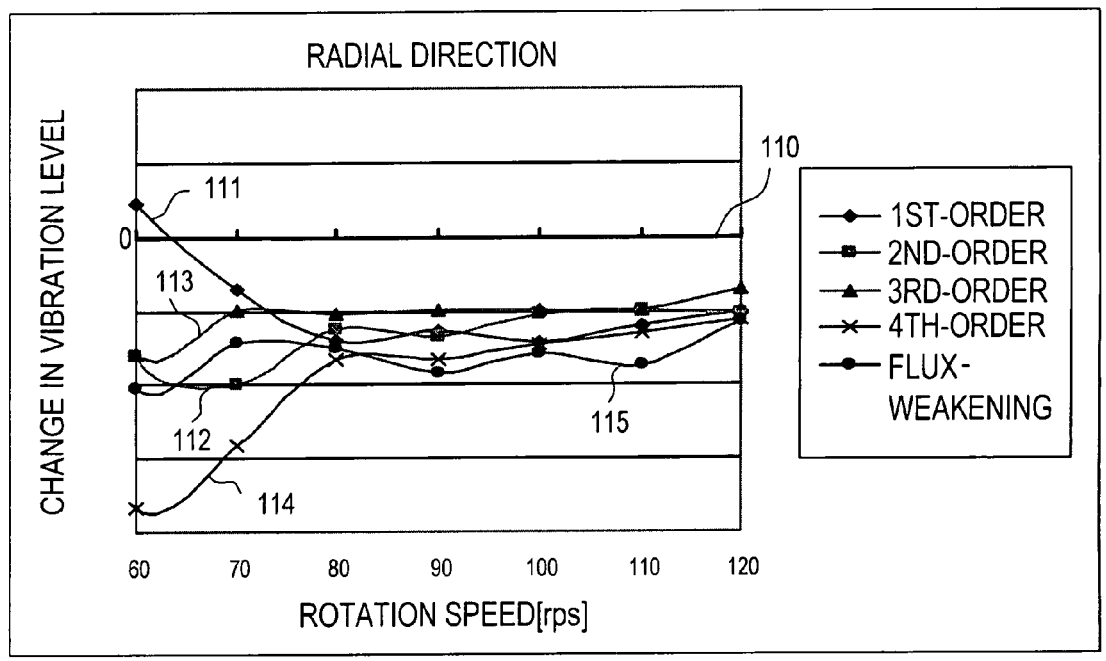
FIG. 8 is a diagram showing the dependence of the level of radial vibration on the rotation speed in the horizontal compressor shown in FIGS. 3A and 3B.

In FIG. 8, with the vertical axis representing a change in the level of vibration of the horizontal compressor 4 in the radial direction relative to a case where $i_d$ is kept equal to zero, curves 111, 112, 113, and 114 respectively represent the dependence of the vibration level change on the rotation speed when d-axis currents of first, second, third, and fourth order are injected. Moreover, a curve 115 represents the dependence of the vibration level change on the rotation speed when flux-weakening control is simply performed, that is, when $i_d$ having the magnitude $A_0$ is constantly passed.

Figure 9:
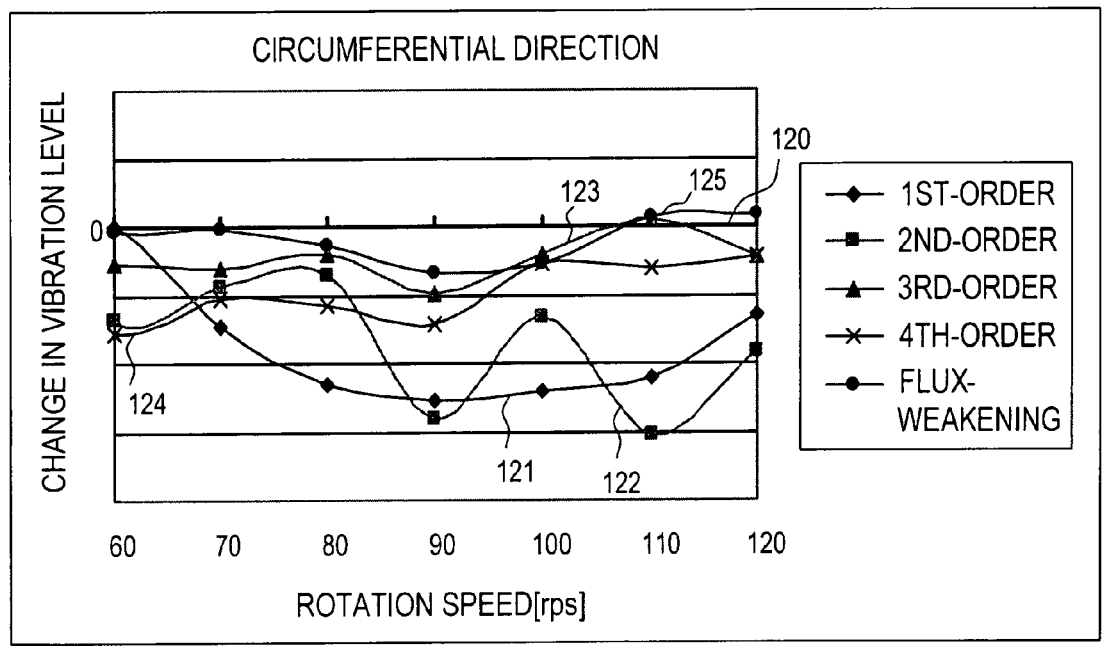
FIG. 9 is a diagram showing the dependence of the level of circumferential vibration on the rotation speed in the horizontal compressor shown in FIGS. 3A and 3B.

In FIG. 9, with the vertical axis representing a change in the level of vibration of the horizontal compressor 4 in the circumferential direction relative to a case where $i_d$ is kept equal to zero, curves 121, 122, 123, and 124 respectively represent the dependence of the vibration level change on the rotation speed when the d-axis currents of first, second, third, and fourth order are injected. Moreover, a curve 125 represents the dependence of the vibration level change on the rotation speed when flux-weakening control is simply performed, that is, when $i_d$ having the magnitude $A_0$ is constantly passed.

Figure 10:
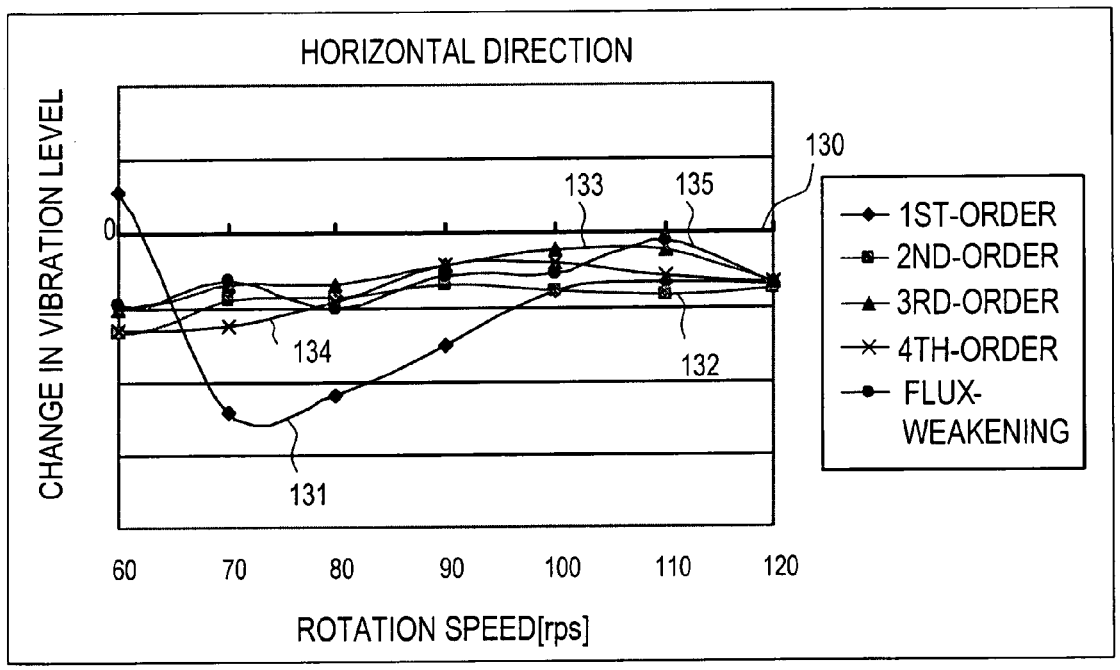
FIG. 10 is a diagram showing the dependence of the level of horizontal vibration on the rotation speed in the horizontal compressor shown in FIGS. 3A and 3B.

In FIG. 10, with the vertical axis representing a change in the level of vibration of the horizontal compressor 4 in the horizontal direction relative to a case where $i_d$ is kept equal to zero, curves 131, 132, 133, and 134 respectively represent the dependence of the vibration level change on the rotation speed when the d-axis currents of first, second, third, and fourth order are injected. Moreover, a curve 135 represents the dependence of the vibration level change on the rotation speed when flux-weakening control is simply performed, that is, when $i_d$ having the magnitude $A_0$ is constantly passed.

Figure 11:
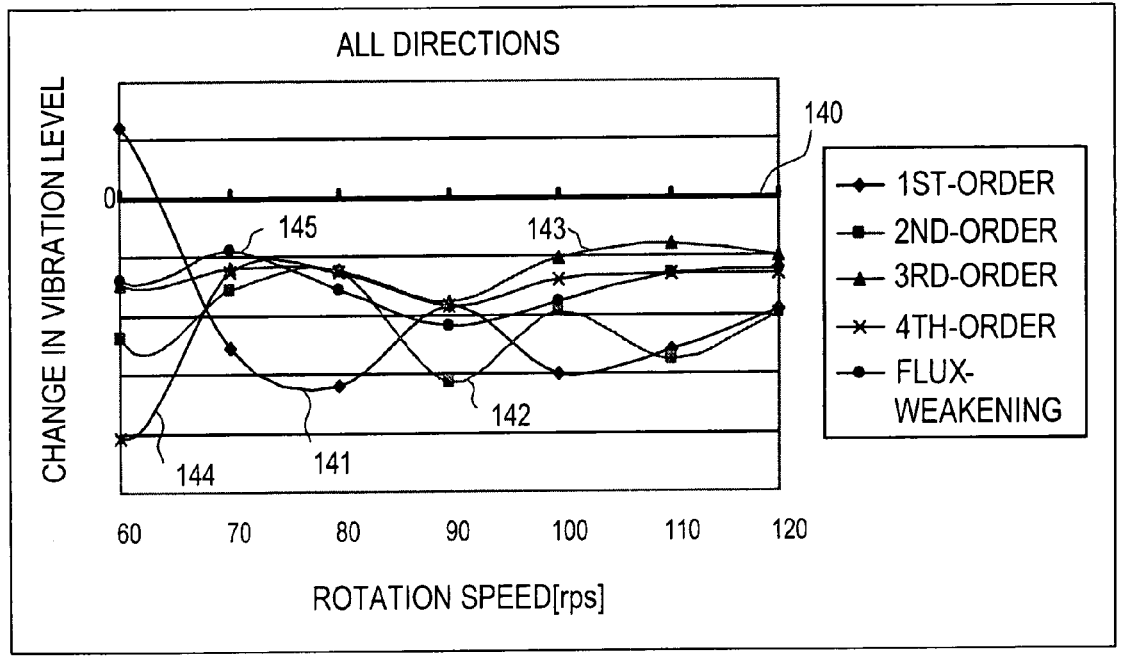
FIG. 11 is a diagram showing the dependence of the level of vibration in all directions on the rotation speed in the horizontal compressor shown in FIGS. 3A and 3B.

In FIG. 11, with the vertical axis representing a change in the level of vibration of the horizontal compressor 4 in all directions relative to a case where $i_d$ is kept equal to zero, curves 141, 142, 143, and 144 respectively represent the dependence of the vibration level change on the rotation speed when the d-axis currents of first, second, third, and fourth order are injected. Moreover, a curve 145 represents the dependence of the vibration level change on the rotation speed when flux-weakening control is simply performed, that is, when $i_d$ having the magnitude $A_0$ is constantly passed.

The change in the level of vibration of the horizontal compressor 4 in all directions corresponds to the sum of the changes of the level of vibration in the radial, circumferential, and horizontal directions. In FIGS. 8 to 11, the horizontal axis represents the rotation speed (rps) of the rotor of the motor 1. Here, in FIGS. 8 to 11, straight lines 110, 120, 130, and 140 shown in FIGS. 8 to 11 represent no change in the vibration level, indicating that the vibration level becomes lower toward the lower end of the vertical axis (in the planes of these drawings).

Here, when $k_1$ is 1, 2, 3, or 4, "injecting the d-axis current of $k_1$-th order" means that the magnetic flux controller 16 is made to output the specified γ-axis current value $i_\gamma{}^*$ given by formulae (2), (3a), and (3b) with n being equal to $k_1/2$. Incidentally, the curves 115, 125, 135, and 145 represent the results of experiments obtained when $i_\gamma{}^*$ is forcibly kept at $A_0$.

As shown in FIG. 8, at a rotation speed in the 60 to 120 rps range, injecting the d-axis current of fourth order is most effective in reducing the level of vibration in the radial direction (assuming that the curve 115 is ignored). At a rotation speed in the 100 to 120 rps range, the d-axis currents of first and fourth order are approximately equally effective in reducing the level of vibration in the radial direction.

As shown in FIG. 9, at a rotation speed of 60 rps, injecting the d-axis current of fourth order is most effective in reducing the level of vibration in the circumferential direction; at rotation speeds of 70, 80, and 100 rps, injecting the d-axis current of first order is most effective; and, at rotation speeds of 90, 110, and 120 rps, injecting the d-axis current of second order is most effective.

As shown in FIG. 10, at a rotation speed of 60 rps, injecting the d-axis current of second (or fourth) order is most effective in reducing the level of vibration in the horizontal direction; at rotation speeds of 70, 80, and 90 rps, injecting the d-axis current of first order is most effective; and, at a rotation speed of 100 rps, injecting the d-axis current of first (or second) order is most effective.

As shown in FIG. 11, at a rotation speed of 60 rps, injecting the d-axis current of fourth order is most effective in reducing the level of vibration in all directions; at rotation speeds of 70, 80, and 100 rps, injecting the d-axis current of first order is most effective; and, at rotation speeds of 90, 110, and 120 rps, injecting the d-axis current of second order is most effective.

The level of vibration in each direction varies with a change in the order of the d-axis current to be injected; it varies, even when the d-axis current of the same order is injected, at different rotation speeds. The reason is that a change in the order changes how the vibration is cancelled out, and that how the vibration is cancelled out depends on the rotation speed.

The order of the d-axis current that should be injected at a certain rotation speed to reduce the vibration in the most effective way depends on, for example, the mechanical structural properties of the horizontal compressor 4. In addition, the optimum order depends on the direction of vibration to be reduced. For example, suppose that the rotation speed is 70 rps. Then, injecting the d-axis current of fourth order is best suited to reducing the vibration in the radial direction, while injecting the d-axis current of first order is best suited to reducing the vibration in the circumferential direction.

With consideration given to the results of experiments shown in FIGS. 8 to 11, the magnetic flux controller 16 shown in FIG. 4 dynamically sets the value of n in formula (2) according to the speed information commensurate with the rotation speed of the rotor, and produces $i_\gamma{}^*$ by using the value of n thus set. This embodiment deals with an example in which the estimated motor speed $\omega_e$ is used as the speed information. However, it is also possible to use the specified motor speed value $\omega^*$ instead.

For example, suppose that priority is given to reducing the vibration in the radial direction. Then, when the rotation speed indicated by the speed information is 60 rps, n simply has to be set equal to 2; when the rotation speed indicated thereby is 100 rps, n simply has to be set equal to ½ or 2.

Suppose that priority is given to reducing the vibration in the circumferential direction. Then, when the rotation speed indicated by the speed information is 80 rps, n simply has to be set equal to ½; when the rotation speed is 110 rps, n simply has to be set equal to 1. Moreover, for example, suppose that priority is given to reducing the vibration in all directions. Then, when the rotation speed indicated by the speed information is 60 rps, n simply has to be set equal to 2; when the rotation speed is 70 rps, n simply has to be set equal to ½. In this way, the d-axis current having the optimum frequency to reducing the vibration to be reduced is supplied, making it possible to effectively reduce the vibration.

Incidentally, how to set $k_1$ and n with consideration given to the results of experiments is as follows. First, for each rotation speed, a plurality of possible values (possible proportionality coefficients) are set for $k_1$ to be finally adopted by the magnetic flux controller 16, and the vibration states (vibration level) of the horizontal compressor 4, the vibration states observed when the plurality of possible values are individually adopted, are measured by way of experiment. As a result, the curves shown in FIGS. 8 to 11 are obtained. Then, based on the results of measurement (results of experiments) thus obtained, the optimum values for $k_1$ and n are determined for each rotation speed, and the magnetic flux controller 16 is made to determine the actual value of n based on the values thus determined.

Figure 12:
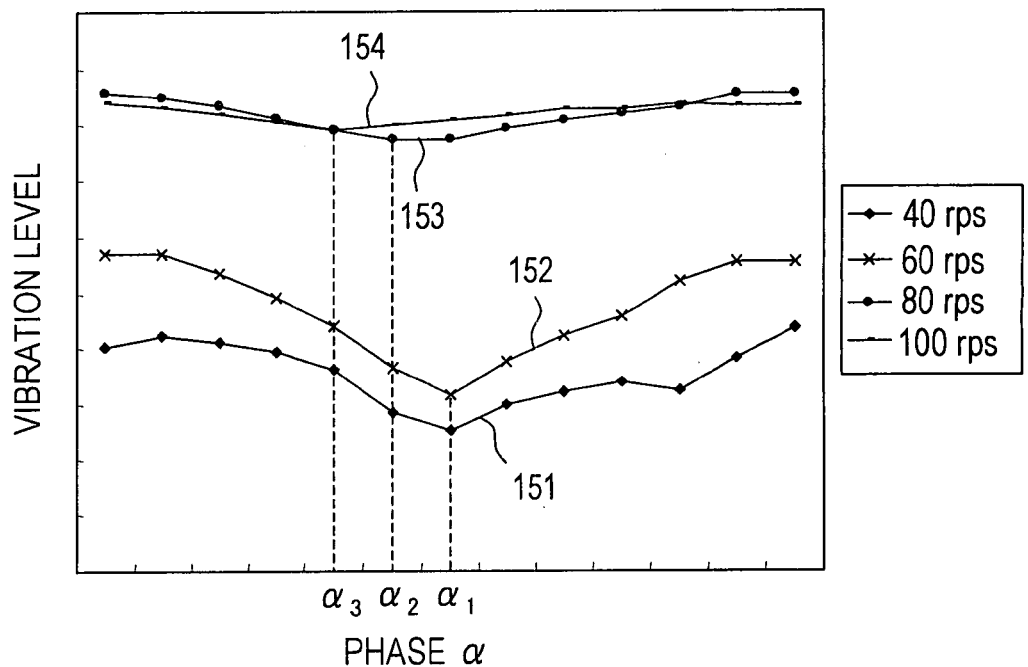
FIG. 12 is a diagram showing the dependence of the radial vibration level on the phase in the horizontal compressor shown in FIGS. 3A and 3B.

Next, the relationship between the vibration and the phase α will be described. FIG. 12 is a diagram showing the relationship between the level of vibration of the horizontal compressor 4 in the radial direction and the phase α. FIG. 12 shows the results of experiments (results of measurement) of the level of vibration in the radial direction in a case where the phase α is made to vary under the conditions that $A=A_0$ ($A_0$ is constant) and n=2.

In FIG. 12, the vertical axis represents the level of vibration of the horizontal compressor 4 in the radial direction, and the horizontal axis represents the phase α. In FIG. 12, the vibration level becomes lower toward the lower end of the vertical axis (in the plane of this drawing). In FIG. 12, a broken line 151 represents the relationship between the level of vibration in the radial direction and the phase α when the rotation speed of the rotor is 40 rps, whereas broken lines 152, 153, and 154 represent the relationship between the level of vibration in the radial direction and the phase α when the rotation speeds of the rotor are 60, 80, and 100 rps respectively.

As shown in FIG. 12, the level of vibration in the radial direction varies with a change in the phase α; it varies, even in the same phase α, at different rotation speeds. The reason is that a change in the phase α changes how the vibration in the radial direction is cancelled out, and that how the vibration is cancelled out depends on the rotation speed.

For example, suppose that the rotation speeds are 40 and 60 rps. Then, when the phase α is a given phase $\alpha_1$, the vibration in the radial direction reaches the lowest level; when the phase α is other than $\alpha_1$ (for instance, when the phase α is $\alpha_2$ or $\alpha_3$), the vibration in the radial direction is not at the lowest level. Alternatively, for example, suppose that the rotation speed is 80 rps. Then, when the phase α is a given phase $\alpha_2$, the vibration in the radial direction reaches the lowest level; when the phase α is other than $\alpha_2$ (for instance, when the phase α is $\alpha_1$ or $\alpha_3$), the vibration in the radial direction is not at the lowest level. Moreover, for example, suppose that the rotation speed is 100 rps. Then, when the phase α is a given phase $\alpha_3$, the vibration in the radial direction reaches the lowest level; when the phase α is other than $\alpha_3$ (for instance, when the phase α is $\alpha_1$ or $\alpha_2$), the vibration in the radial direction is not at the lowest level. Here, $\alpha_1 \neq \alpha_2 \neq \alpha_3$ holds.

The phase α of the d-axis current that should be injected at a certain rotation speed to reduce the vibration in the most effective way depends on, for example, the mechanical structural properties of the horizontal compressor 4. In addition, the optimum phase α depends on the rotation speed.

With consideration given to the results of experiments shown in FIG. 12, the magnetic flux controller 16 shown in FIG. 4 dynamically sets the phase α in formula (2) according to the speed information commensurate with the rotation speed of the rotor, and produces $i_\gamma^*$ by using the phase α thus set. This embodiment deals with an example in which the estimated motor speed $\omega_e$ is used as the speed information. However, it is also possible to use the specified motor speed value $\omega^*$ instead.

For example, when n=2, suppose that the purpose is to reduce the vibration in the radial direction. Then, when the rotation speed indicated by the speed information is 40 or 60 rps, α simply has to be $\alpha_1$; when the rotation speed indicated thereby is 100 rps, α simply has to be $\alpha_3$. In this way, the d-axis current having the optimum phase to reducing the vibration to be reduced is supplied, making it possible to effectively reduce the vibration.

Incidentally, how to set the phase α with consideration given to the results of experiments is as follows. First, for each rotation speed, a plurality of possible phases ($\alpha_1$, $\alpha_2$, $\alpha_3$ and so on) are set for the phase α to be finally adopted by the magnetic flux controller 16, and the vibration states (vibration level) of the horizontal compressor 4, the vibration states observed when the plurality of possible phase are individually adopted, are measured by way of experiment. As a result, the broken lines shown in FIG. 12 are obtained. Then, based on the results of measurement (results of experiments) thus obtained, the optimum phase α is determined for each rotation speed, and the magnetic flux controller 16 is made to determine the actual phase α based on the phase α thus determined.

Other things being equal, when $\alpha=\alpha_4$, the level of vibration in a first direction becomes relatively high, whereas the level of vibration in a second direction becomes relatively low. Likewise, when $\alpha=\alpha_5$, the level of vibration in the first direction becomes relatively low, whereas the level of vibration in the second direction becomes relatively high. Here, the first and second directions are mutually different directions, each being one of the radial direction, the circumferential direction, and the horizontal direction. Moreover, $\alpha_4 \neq \alpha_5$ holds. This makes it possible to preferentially reduce the vibration in a particular direction by changing the phase α. For example, in a case where the problem arises from the vibration in the radial direction but not from the vibration in the circumferential or horizontal direction, it is possible to select the optimum phase α to reducing the vibration in the radial direction.

Incidentally, the horizontal compressor 4 has its own specific resonance frequency depending on the mechanical structure thereof. When the horizontal compressor 4 mechanically vibrates at this specific resonance frequency or a frequency close to it, the level of vibration is much higher than that observed at other frequencies. On the other hand, the frequency of the vibration of the horizontal compressor 4 depends on the rotation speed of the rotor of the motor 1. Thus, in a case where, for example, the rotor is rotated at a rotation speed at which the horizontal compressor 4 is made to vibrate at the above-described resonance frequency or a frequency close to it, increasing the gain A in formula (2) is effective.

That is, it is necessary simply to change the gain A in formula (2) according to the speed information described above. For example, when the estimated motor speed $\omega_e$ is a predetermined speed $\omega_1$ corresponding to the above-described resonance frequency, the magnetic flux controller 16 shown in FIG. 4 sets the gain A of $i_\gamma^*$, which is outputted by the magnetic flux controller 16, to $A_1$; when the estimated motor speed $\omega_e$ is a predetermined speed $\omega_2$, the magnetic flux controller 16 sets the gain A of $i_\gamma^*$ which is outputted by the magnetic flux controller 16, to $A_2$. Here, $\omega_1 \neq \omega_2$, and $A_1 > A_2$. This makes it possible to prevent the vibration from becoming abnormally strong at a particular rotation speed.

According to the method disclosed in JP-A-2004-056839, the d-axis current is varied according to the rotor position so as to reduce the cogging torque. However, to reduce the cogging torque, the magnitude of the variations of the d-axis current has to be kept constant so as to cancel out a magnetic flux change that is determined solely by the positional relationship between the rotor and the stator. That is, according to the method disclosed in JP-A-2004-056839, the magnitude of the variations of the d-axis current does not depend on the rotation speed.

Figure 13:
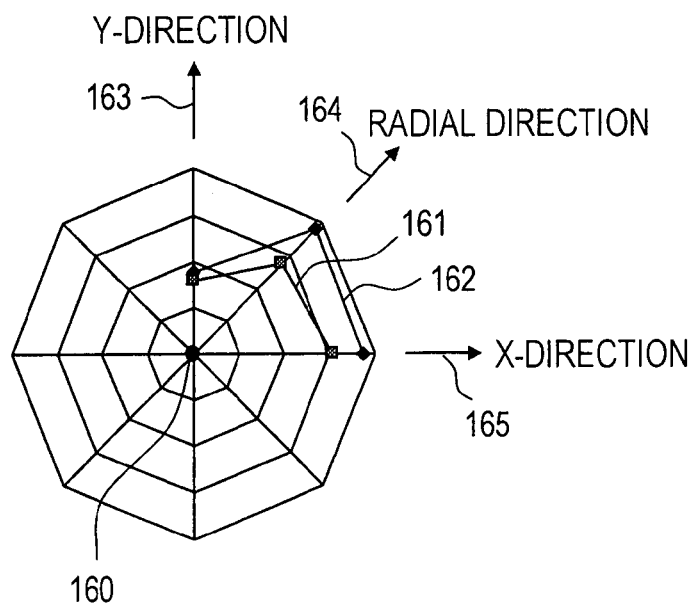
FIG. 13 is a diagram showing a comparison of the vibration levels observed when the method of the first embodiment of the present invention is adopted to those observed when the d-axis current is maintained at zero.

FIG. 13 is a diagram showing a comparison of the vibration levels observed when the method of this embodiment is adopted to those observed when $i_d$ is kept equal to 0. A broken line 161 connecting three measurement data points represents the results obtained by the method of this embodiment, whereas a broken line 162 connecting the other three measurement data points represents the results obtained when $i_d$ is kept equal to 0. It should be understood that the "method of this embodiment" means the method by which the magnetic flux controller 16 shown in FIG. 4 is made to output $i_\gamma^*$ given by formulae (2), (3a), and (3b), including the method by which the value of n, the phase $\alpha$, and (or) the gain A are changed according to the speed information.

In FIG. 13, the reference numeral 160 represents the origin. As a measurement data point is directed upward away from the origin 160 in the plane of the drawing as indicated by an arrow 163, the level of vibration in the Y-direction (see FIG. 3A) is increased. As a measurement data point is directed to the upper right away from the origin 160 in the plane of the drawing as indicated by an arrow 164, the level of vibration in the radial direction is increased. As a measurement data point is directed rightward away from the origin 160 in the plane of the drawing as indicated by an arrow 165, the level of vibration in the X-direction is increased.

As will be clear from FIG. 13, the levels of vibrations in the Y-, radial, and X-directions are all reduced by using the method of this embodiment. Incidentally, the level of vibration in the Y-direction is relatively low even when $i_d=0$. This is presumably because the horizontal compressor 4 is fastened to the installation surface 6 on the side thereof facing away from the direction indicated by the arrow 163 (see FIG. 3A).

Figure 14:
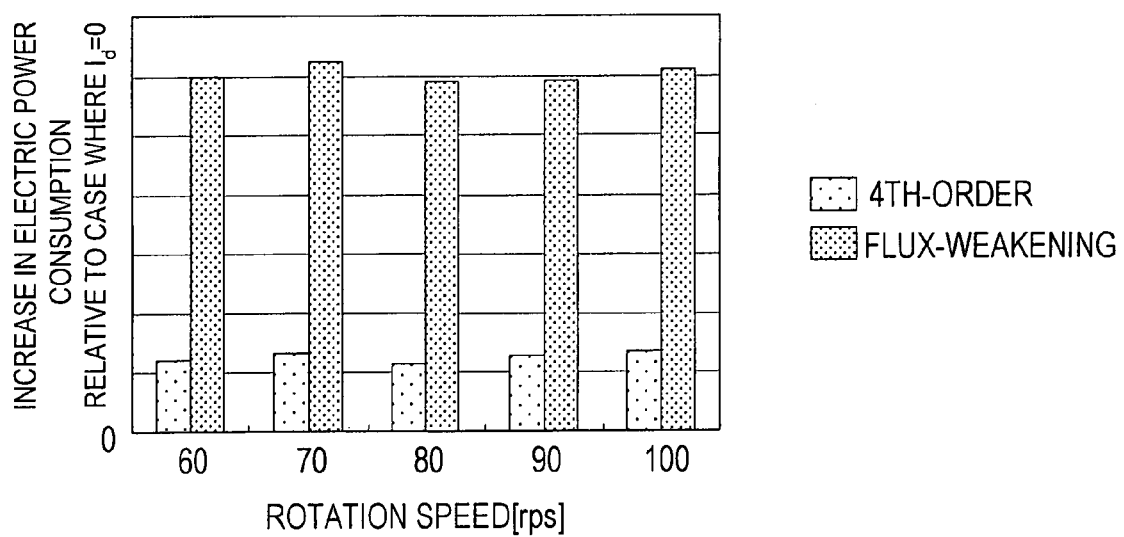
FIG. 14 is a diagram illustrating an increase in the electric power consumption when the method of the first embodiment of the present invention is adopted (as compared to when a method where the d-axis current is maintained at zero is adopted)

FIG. 14 shows an increase in the electric power consumption when the method of this embodiment is adopted relative to a case where $i_d$ equals zero, and an increase in the electric power consumption when flux-weakening control in which $i_d=A_0$ ($A_0$ is constant) is performed. FIG. 14 shows data obtained when $A=A_0$ and $n=2$. Needless to say, at all rotation speeds (60 to 100 rps), the former suffers much less from an increase in the electric power consumption than the latter.

Figure 15:
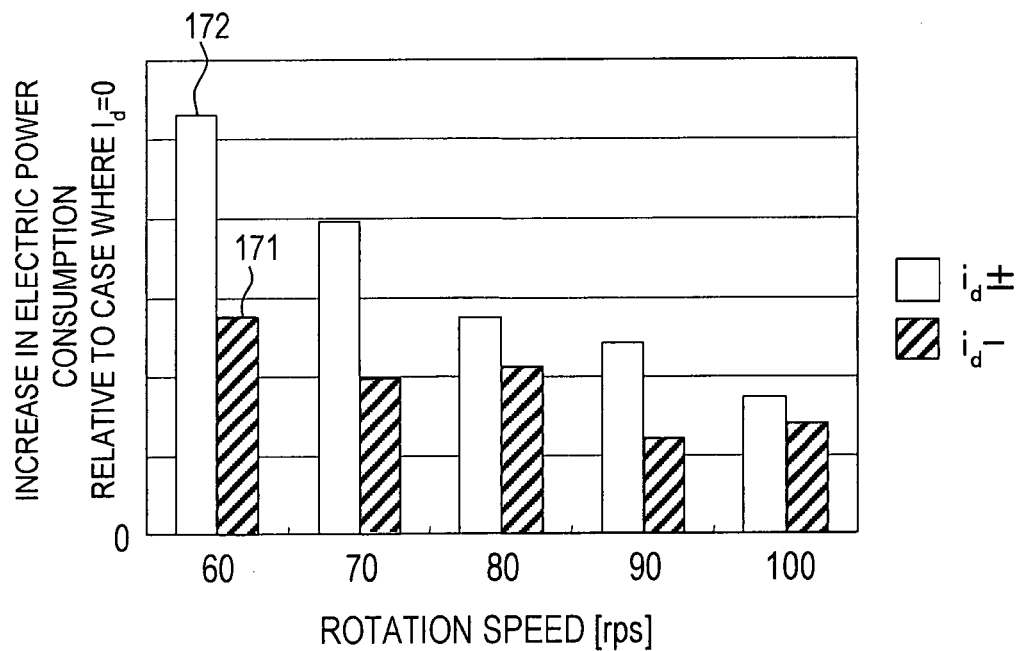
FIG. 15 is a diagram illustrating an increase in the electric power consumption when the method of the first embodiment of the present invention is adopted (as compared to when a method where the positive/negative d-axis current is injected is adopted)
Figure 16:
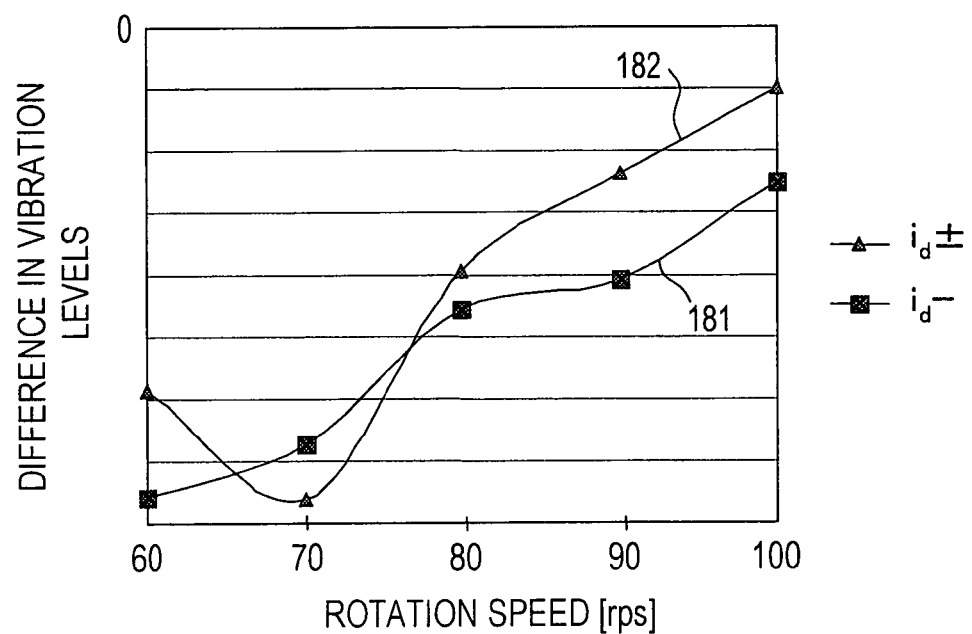
FIG. 16 is a diagram illustrating how effective the method of the first embodiment of the present invention is in reducing the vibration (as compared to the method where the positive/negative d-axis current is injected)

Furthermore, FIG. 15 shows the results of comparison of the electric power consumption between the method of this embodiment and the method in which a positive/negative d-axis current is injected, and FIG. 16 shows the results of comparison of the vibration between them. The method in which a positive/negative d-axis current is injected, which corresponds to the method disclosed in JP-A-2005-117875, is a method in which $i_\gamma^* = i_{ref}^*$ irrespective of whether $i_{ref}^*$ given by formula (2) is positive or negative.

In FIG. 15, the reference numeral 171 represents an increase in the electric power consumption observed when the method of this embodiment is adopted relative to a case where $i_d$ equals zero, and the reference numeral 172 represents an increase in the electric power consumption observed when the method in which a positive/negative d-axis current is injected is adopted relative to a case where $i_d$ equals zero. It is needless to say that, since only a negative d-axis current is injected in the method of this embodiment, the former suffers less from an increase in the electric power consumption than the latter at all rotation speeds (60 to 100 rps).

In FIG. 16, a curve 181 represents a difference in vibration level between a case where $i_d$ equals zero and a case where the method of this embodiment is adopted, and a curve 182 represents a difference in vibration level between a case where $i_d$ equals zero and a case where the method in which a positive/negative d-axis current is injected is adopted. In FIG. 16, the vibration level becomes lower toward the lower end of the vertical axis (in the plane of the drawing). Incidentally, FIG. 16 shows a difference in levels of vibrations in the radial direction.

As shown in FIG. 16, both methods are equally effective in reducing the vibration level at all rotation speeds (60 to 100 rps). The reason is that, since the vibration in the radial direction is caused when the stator pulls the rotor, the vibration in the radial direction can be reduced only by weakening the force with which the stator pulls the rotor, that is, only by passing a negative d-axis current. However, the method of this embodiment is expected to reduce the vibration more effectively than the method in which a positive/negative d-axis current is injected since the former requires only a negative d-axis current to be injected, and is accordingly, unlike the latter, free from a period in which the magnetic attractive force is increased (an increase in the magnetic attractive force usually results in an increase in the vibration).

Furthermore, since the method of this embodiment does not vary, for example, the q-axis current for reducing the vibration, it is possible to reduce the magnetic attractive force without increasing torque pulsation.

Second Embodiment

The first embodiment described above deals with a case in which the axis error $\Delta\theta$ converges to zero. That is, the motor control device 3 according to the first embodiment estimates the d-q axes. As a result, $i_d$ and $i_\gamma^*$ are substantially equal. However, what has been explained in the first embodiment is also applicable to a case in which any axes other than the d-q axes is estimated. Hereinafter, a second embodiment will be described, taking up a case in which the dm-qm axes is estimated. What has been explained in the first embodiment can be applied, unless inconsistent, to the second embodiment. The dm-qm axes, which is proposed by the applicant, is the axes estimated for control purposes. The technology relating to the dm-qm axes is discussed in detail in Japanese Patent Application No. 2006-177646.

The method used in the second embodiment for estimating the dm-qm axes is hereinafter referred to as the "dmqm method". First, for easy understanding of the significance of the dmqm method, a brief description will be given of a common method for achieving maximum torque control.

A common motor control device controls a motor so that the axis error $\Delta\theta$ converges to zero. On the other hand, a formula for calculating the d-axis current $i_d$ for the purpose of maximum torque control exploiting a reluctance torque is widely known, and generally, to achieve maximum torque control, the specified γ-axis current value $i_\gamma^*$ is calculated according to formula (4) below.

$$i_\gamma^* = \frac{\Phi_a}{2(L_q - L_d)} - \sqrt{\frac{\Phi_a^2}{4(L_q - L_d)^2} + i_\delta^2} \quad (4)$$

Achieving maximum torque control based on formula (4) above presupposes that the axis error $\Delta\theta$ is kept equal to zero, and, to calculate the axis error $\Delta\theta$, it is necessary to previously calculate parameters needed in calculation, such as the q-axis inductance $L_q$. Thus, to achieve maximum torque control, first, the relevant parameters need to be so adjusted that the axis error $\Delta\theta$ is kept equal to zero; in addition, second, the parameters used in formula (4) need to be adjusted; furthermore, third, the specified γ-axis current value $i_\gamma^*$ needs to be calculated constantly according to formula (4).

The dmqm method contributes to simplifying the adjustment of calculation parameters and reducing the amount of calculation. Now, the dmqm method will be described.

Figure 17:
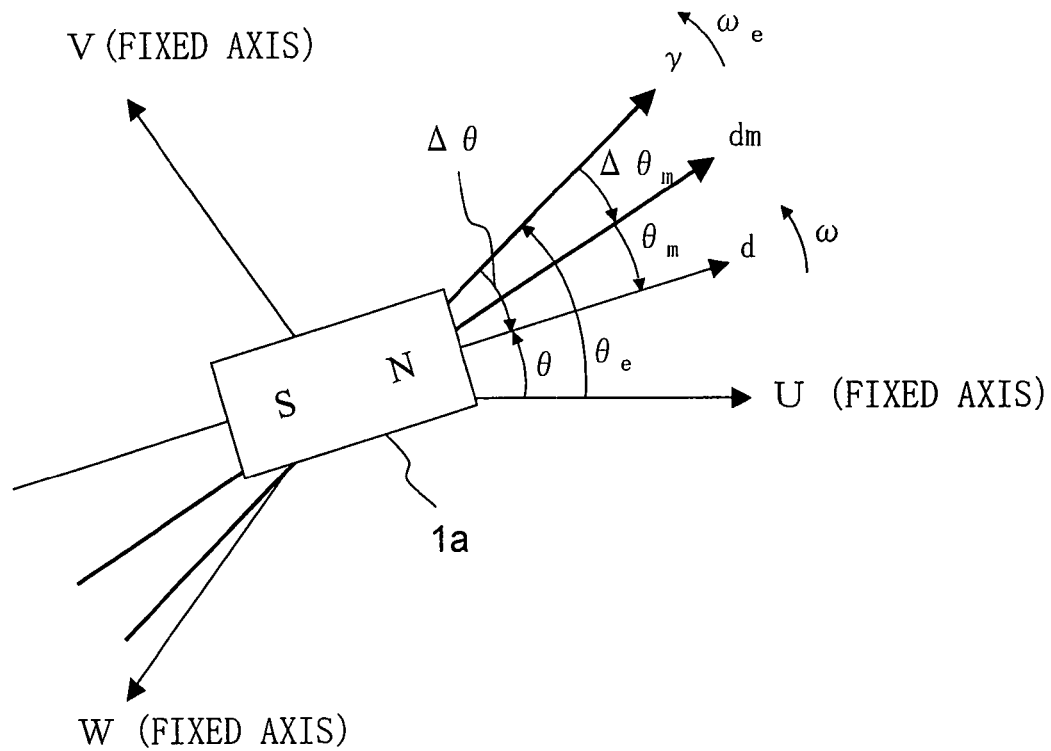
FIG. 17 is an analysis model diagram of the motor in a second embodiment of the present invention.
Figure 18:
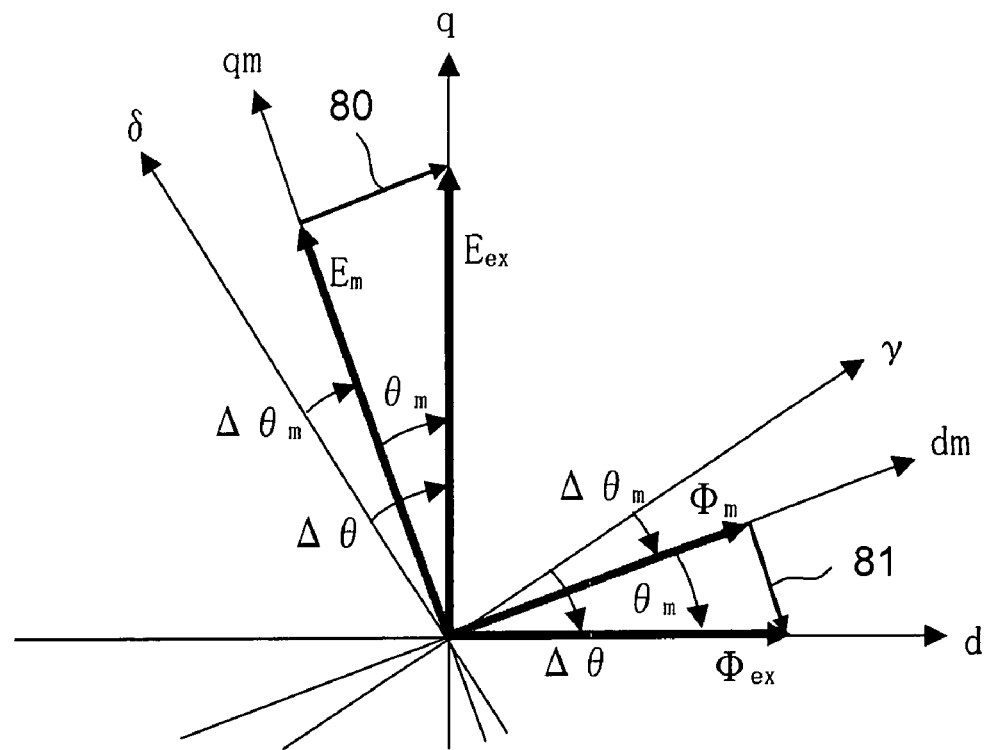
FIG. 18 is an analysis model diagram of the motor in the second embodiment.

FIGS. 17 and 18 are analysis model diagrams of the motor 1 for explaining the dmqm method. FIG. 17 is a more detailed version of the analysis model diagram of FIG. 2.

The rotation axis whose direction coincides with that of the current vector to be fed to the motor 1 when maximum torque control is achieved is called the qm-axis. The rotation axis that lags behind the qm-axis by an electrical angle of 90 degrees is called the dm-axis. The coordinate axes consisting of the dm and qm-axes is called the dm-qm axes.

As is well-known, the motor current that achieves maximum torque control has a positive q-axis component and a negative d-axis component. Thus, the qm-axis leads the q-axis in phase. The lead in phase occurs counter-clockwise in FIGS. 17 and 18.

The phase (angle) of the q-axis relative to the qm-axis is represented by $\theta_m$, and the phase (angle) of the qm-axis relative to the δ-axis is represented by $\Delta\theta_m$. Then, needless to say, the phase of the d-axis relative to the dm-axis also equals $\theta_m$, and the phase of the dm-axis relative to the γ-axis also equals $\Delta\theta_m$. What $\theta_m$ represents is the lead angle of the qm-axis (dm-axis) relative to the q-axis (d-axis). What $\Delta\theta_m$ represents is the axis error between the qm-axis and the δ-axis (the axis error between the dm-qm axes and the γ-δ axes). The value of $\Delta\theta$, which is the axis error between the d- and γ-axes, is given by $\Delta\theta = \Delta\theta_m + \theta_m$.

As described above, here, it is assumed that the dm-axis leads the d-axis in phase and that $\theta_m$ is then negative. Likewise, when the γ-axis leads the dm-axis in phase, $\Delta\theta_m$ is negative. The vectors (such as $E_m$) shown in FIG. 18 will be described later.

The dm-axis and qm-axis components of the motor current $I_a$ are referred to as the dm-axis current $i_{dm}$ and the qm-axis current $i_{qm}$ respectively. The dm-axis and qm-axis components of the motor voltage $V_a$ are referred to as the dm-axis voltage $v_{dm}$ and the qm-axis voltage $v_{qm}$ respectively.

According to the dmqm method, the axis error $\Delta\theta_m$ between the qm-axis (dm-axis) and the δ-axis (γ-axis) is estimated, and thereby the γ-axis, which is an estimated axis, is made to converge to the dm-axis (i.e., the axis error $\Delta\theta_m$ is made to converge to zero). Then, the motor current $I_a$ is broken down into the qm-axis current $i_{qm}$ parallel to the qm-axis and the dm-axis current $i_{dm}$ parallel to the dm-axis, and thereby the motor 1 is vector-controlled.

Even in this case, as with the common method for achieving maximum torque control previously described with reference to formula (4), the parameters for estimating the axis error $\Delta\theta_m$ (for making the axis error $\Delta\theta_m$ converge to zero) need to be adjusted. Here, however, completing this adjustment simultaneously brings about the completion of the adjustment of the parameters for achieving maximum torque control. That is, since the adjustment of the parameters for estimating the axis error is shared as the adjustment of the parameters for achieving maximum torque control, quite advantageously, the necessary adjustments can be made very easily.

Figure 19:
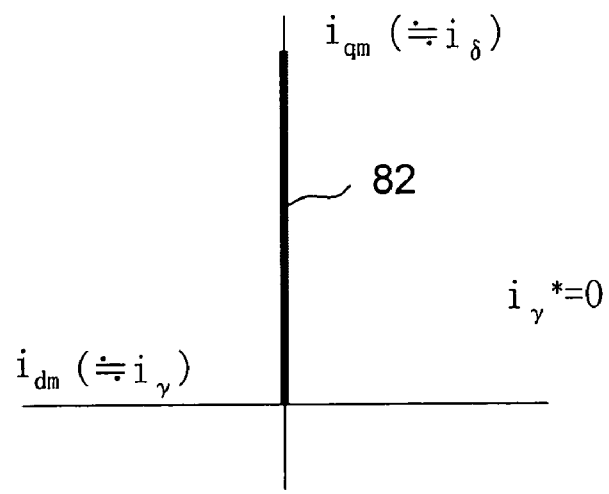
FIG. 19 is a diagram showing an example of the current locus of the motor current in the second embodiment of the present invention.

Moreover, as will be clear from the definition of the qm-axis, the current locus of the motor current $I_a$ as observed in maximum torque control lies on the qm-axis, as indicated by a solid line 82 in FIG. 19. Thus, in maximum torque control, it is not necessary to calculate the specified γ-axis current value $i_\gamma^*$ according to a complicated formula like formula (4) above; this helps alleviate the burden of calculation.

Now, the dmqm method will be described in more detail with reference to voltage equations. The extension induction voltage (extended electromotive force) equation on the real axes are given by formula (26), and the extension induction voltage (extended electromotive force) $E_{ex}$ is given by formula (27). In the formulae below, p represents the differentiation operator. It should be noted that, for consistency with the formula numbers used in the specification of Japanese Patent Application No. 2006-177646, in the present specification, formula numbers (5) to (25) are vacant.

$$\begin{bmatrix} v_d \\ v_q \end{bmatrix} = \begin{bmatrix} R_a + pL_d & -\omega L_q \\ \omega L_q & R_a + pL_d \end{bmatrix} \begin{bmatrix} i_d \\ i_q \end{bmatrix} + \begin{bmatrix} 0 \\ E_{ex} \end{bmatrix} \quad (26)$$

$$E_{ex} = \omega((L_d - L_q)i_d + \Phi_a) - (L_d - L_q)(pi_q) \quad (27)$$

Performing coordinate conversion so that formula (26) on the real axes is converted into one on the γ-δ axes estimated for control purposes gives formula (28). Ignoring the third term in the right side of formula (28) for the sake of simplicity gives formula (29).

$$\begin{bmatrix} v_\gamma \\ v_\delta \end{bmatrix} = \begin{bmatrix} R_a + pL_d & -\omega L_q \\ \omega L_q & R_a + pL_d \end{bmatrix} \begin{bmatrix} i_\gamma \\ i_\delta \end{bmatrix} + E_{ex}\begin{bmatrix} -\sin\Delta\theta \\ \cos\Delta\theta \end{bmatrix} - (p\Delta\theta)L_d\begin{bmatrix} -i_\delta \\ i_\gamma \end{bmatrix} \quad (28)$$

$$\begin{bmatrix} v_\gamma \\ v_\delta \end{bmatrix} = \begin{bmatrix} R_a + pL_d & -\omega L_q \\ \omega L_q & R_a + pL_d \end{bmatrix} \begin{bmatrix} i_\gamma \\ i_\delta \end{bmatrix} + E_{ex}\begin{bmatrix} -\sin\Delta\theta \\ \cos\Delta\theta \end{bmatrix} \quad (29)$$

Rewriting formula (29) with respect to the dm-qm axes gives formula (30).

$$\begin{bmatrix} v_{dm} \\ v_{qm} \end{bmatrix} = \begin{bmatrix} R_a + pL_d & -\omega L_q \\ \omega L_q & R_a + pL_d \end{bmatrix} \begin{bmatrix} i_{dm} \\ i_{qm} \end{bmatrix} + E_{ex}\begin{bmatrix} -\sin\theta_m \\ \cos\theta_m \end{bmatrix} \quad (30)$$

Here, it is assumed that formula (31) holds. Then, considering that $i_d = i_{qm} \cdot \sin\theta_m$, formula (32) holds.

$$L_{q1}i_{qm} = \sin\theta_m\{\Phi_a + (L_d - L_q)i_d\} \quad (31)$$

$$L_{q1}i_{qm} = \sin\theta_m\{\Phi_a + (L_d - L_q)i_d\} = \sin\theta_m\{\Phi_a + (L_d - L_q)i_{qm}\sin\theta_m\} \quad (32)$$

Rearranging formula (30) based on formula (32) gives formula (33). Here, $E_m$ is given by formula (34). The symbol $L_{q1}$ represents the virtual inductance that depends on $\theta_m$. Here, $L_{q1}$ is defined for the sake of convenience to handle the $E_{ex} \cdot \sin\theta_m$ present in the second term in the right side of formula (30) as the voltage drop across the virtual inductance. Incidentally, $L_{q1}$ is negative.

$$\begin{bmatrix} v_{dm} \\ v_{qm} \end{bmatrix} = \begin{bmatrix} R_a + pL_d & -\omega(L_q + L_{q1}) \\ \omega L_q & R_a + pL_d \end{bmatrix} \begin{bmatrix} i_{dm} \\ i_{qm} \end{bmatrix} + E_m \begin{bmatrix} 0 \\ 1 \end{bmatrix} \quad (33)$$

$$E_m = (\omega((L_d - L_q)i_d + \Phi_a) - (L_d - L_q)(pi_q))\cos\theta_m = E_{ex}\cos\theta_m \quad (34)$$

Now, an approximation is made such that the equation $L_m = L_q + L_{q1}$ holds (since $\theta_m$ depends on $i_q$ and $i_{qm}$, $L_{q1}$ depends on $i_q$ and $i_{qm}$; moreover, under the influence of magnetic saturation, $L_q$ also depends on $i_q$ and $i_{qm}$; the dependence of $L_{q1}$ on $i_q$ and the dependence of $L_q$ on $i_q$ are integrated into $L_m$ so that consideration is given to the influence of $i_q$ and $i_{qm}$ at the time of estimation). Now, formula (33) can be rearranged into formula (35).

$$\begin{bmatrix} v_{dm} \\ v_{qm} \end{bmatrix} = \begin{bmatrix} R_a + pL_d & -\omega L_m \\ \omega L_q & R_a + pL_d \end{bmatrix} \begin{bmatrix} i_{dm} \\ i_{qm} \end{bmatrix} + E_m \begin{bmatrix} 0 \\ 1 \end{bmatrix} \quad (35)$$

Further rearranging formula (35) gives formula (36) below. Here, $E_{exm}$ is given by formula (37) below.

$$\begin{bmatrix} v_{dm} \\ v_{qm} \end{bmatrix} = \begin{bmatrix} R_a + pL_d & -\omega L_m \\ \omega L_m & R_a + pL_d \end{bmatrix} \begin{bmatrix} i_{dm} \\ i_{qm} \end{bmatrix} + \quad (36)$$

$$\begin{bmatrix} 0 \\ E_m \end{bmatrix} + \omega(L_q - L_m)\begin{bmatrix} 0 & 0 \\ 1 & 0 \end{bmatrix}\begin{bmatrix} i_{dm} \\ i_{qm} \end{bmatrix}$$

$$= \begin{bmatrix} R_a + pL_d & -\omega L_m \\ \omega L_m & R_a + pL_d \end{bmatrix} \begin{bmatrix} i_{dm} \\ i_{qm} \end{bmatrix} +$$

$$\begin{bmatrix} 0 \\ E_m + \omega(L_q - L_m)i_{dm} \end{bmatrix}$$

$$= \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ E_{exm} \end{bmatrix}$$

$$E_{exm} = (\omega((L_d - L_q)i_d + \Phi_a) - (L_d - L_q)(pi_q))\cos\theta_m + \omega(L_q - L_m)i_{dm} \quad (37)$$
$$= E_m + \omega(L_q - L_m)i_{dm}$$

Suppose that there is an axis error $\Delta\theta_m$ between the γ-δ axes and the dm-qm axes; then, formula (36) can be rearranged into formula (38) below. That is, just as formula (26) is rearranged into formula (28), performing coordinate conversion so that formula (36) on the dm-qm axes is converted into one on the γ-δ axes gives formula (38).

$$\begin{bmatrix} v_\gamma \\ v_\delta \end{bmatrix} = \begin{bmatrix} R_a + pL_d & -\omega L_m \\ \omega L_m & R_a + pL_d \end{bmatrix} \begin{bmatrix} i_\gamma \\ i_\delta \end{bmatrix} + \quad (38)$$

$$E_{exm}\begin{bmatrix} -\sin\Delta\theta_m \\ \cos\Delta\theta_m \end{bmatrix} - (p\Delta\theta_m)L_d\begin{bmatrix} -i_\delta \\ i_\gamma \end{bmatrix}$$

When approximations are made such that $p\Delta\theta_m \approx 0$, $i_{dm} \approx 0$, and $(L_d - L_q)(pi_q) \approx 0$, then $E_{exm}$ given by formula (37) is approximated by formula (39) below.

$$E_{exm} = (\omega((L_d - L_q)i_d + \Phi_a) - (L_d - L_q)(pi_q))\cos\theta_m + \quad (39)$$

-continued
$$\omega(L_q - L_m)i_{dm}$$

$$\approx (\omega((L_d - L_q)i_\delta\sin\theta_m + \Phi_a) - (L_d - L_q)(pi_q))$$

$$\cos\theta_m + \omega(L_q - L_m)i_{dm}$$

$$\approx \omega((L_d - L_q)i_\delta\sin\theta_m + \Phi_a)\cos\theta_m$$

Substituting $L_m = L_q + L_{q1}$ in formula (32) above, then solving the resulting formula for $\theta_m$, and then assuming that $i_\delta \approx i_{qm}$ gives formula (40) below. As expressed by formula (40), $\theta_m$ is a function of $i_\delta$, and accordingly $E_{exm}$ is a function of $i_\delta$.

$$\theta_m = \sin^{-1}\left(\frac{\Phi_a - \sqrt{\Phi_a^2 + 4(L_q - L_m)(L_q - L_d)i_\delta^2}}{2i_\delta(L_q - L_d)}\right) \quad (40)$$

Now, with reference to FIG. 18, a description will be given of the relationship among $E_{ex}$, $E_m$, and $E_{exm}$. Consider $E_{ex}$, $E_m$ and $E_{exm}$ as voltage vectors in a rotating coordinate system. Then, $E_{ex}$ can be called an extension induction voltage vector. The extension induction voltage vector $E_{ex}$ is an induction voltage vector on the q-axis. The extension induction voltage vector $E_{ex}$ can be broken into an induction voltage vector on the qm-axis and an induction voltage vector on the dm-axis. As will be understood from formula (34) above, of these vectors thus broken down, the induction voltage vector on the qm-axis is $E_m$; and the induction voltage vector ($E_{ex} \cdot \sin\theta_m$) on the dm-axis, indicated by the reference numeral 80 in FIG. 18, is the voltage drop vector attributable to the virtual inductance $L_{q1}$.

As will be understood from a comparison between formulae (34) and (37), $E_{exm}$ is the sum of $E_m$ and $\omega(L_q - L_m)i_{dm}$. Thus, in the rotating coordinate system, $E_{exm}$, like $E_m$, is an induction voltage vector on the qm-axis. In maximum torque control, as described above, $i_{dm} \approx 0$, and hence $E_{exm}$ is (substantially) equal to $E_m$.

Next, with reference to FIG. 18, a description will be given of the magnetic flux corresponding to $E_{ex}$, $E_m$, and $E_{exm}$. What $E_{ex}$ represents is an induction voltage generated by the flux linkage $\Phi_{ex}$ of the motor 1 and the rotation of the motor 1. Put the other way around, $\Phi_{ex}$ is calculated by dividing $E_{ex}$ by $\omega$ (assuming that the transient term (the second term in the right side) of $E_{ex}$ given by formula (27) is ignored).

Consider $\Phi_{ex}$ as a flux linkage vector in a rotating coordinate system; then, the flux linkage vector $\Phi_{ex}$ is a flux linkage vector on the d-axis. The flux linkage vector $\Phi_{ex}$ can be broken into a flux linkage vector on the qm-axis and a flux linkage vector on the dm-axis. Of these vectors thus broken down, the flux linkage vector on the dm-axis is represented by $\Phi_m$, and fulfills $\Phi_m = E_m/\omega$; the flux linkage vector ($\Phi_{ex} \cdot \sin\theta_m$) on the qm-axis, indicated by the reference numeral 81 in FIG. 18, is a magnetic flux vector attributable to the virtual inductance $L_{q1}$.

Define $\Phi_{exm} = E_{exm}/\omega$; then $\Phi_{exm}$ is the sum of $\Phi_m$ and $(L_q - L_m)i_{dm}$. Thus, in the rotating coordinate system, $\Phi_{exm}$, like $\Phi_m$, is a flux linkage vector on the dm-axis. In maximum torque control, as described above, $i_{dm} \approx 0$, and hence $\Phi_{exm}$ is (substantially) equal to $\Phi_m$.

Figure 20:
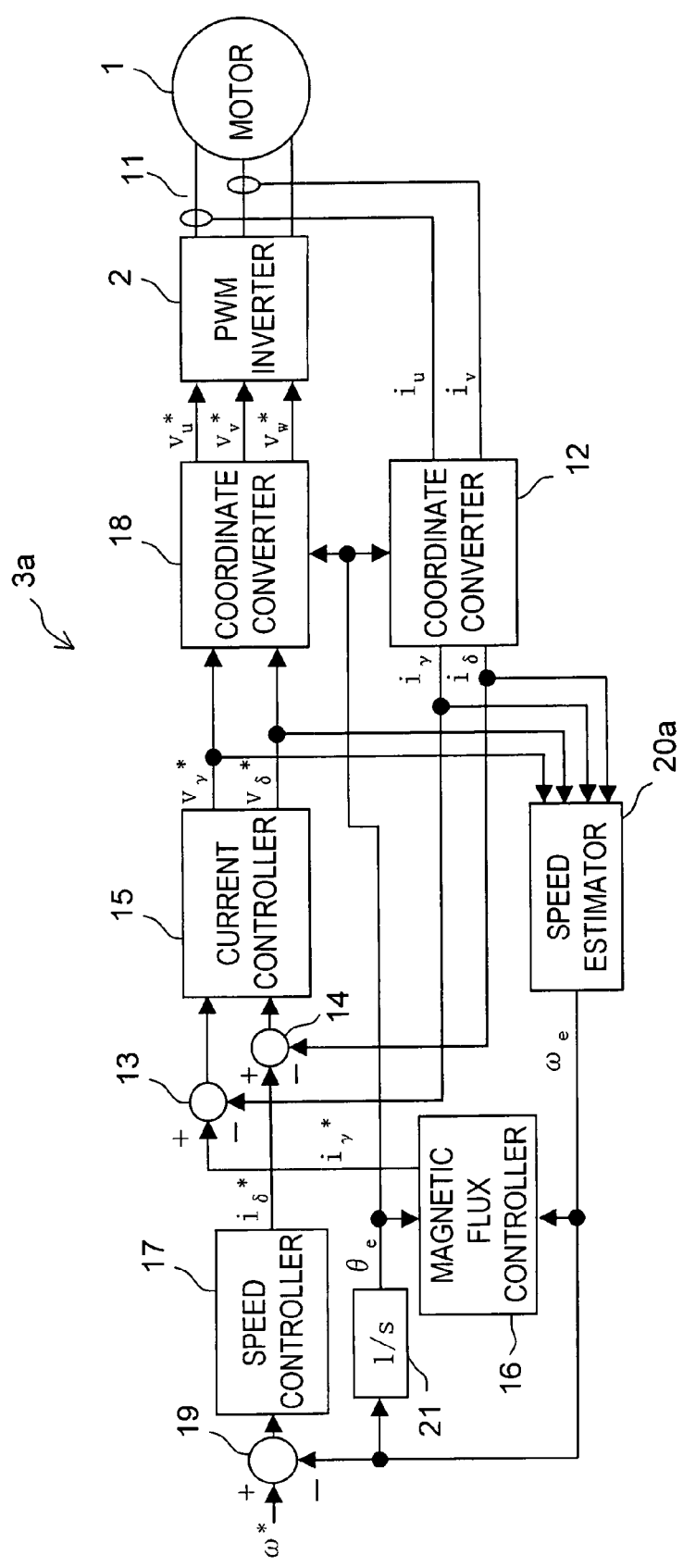
FIG. 20 is a configuration block diagram of a motor drive system in the second embodiment of the present invention.

FIG. 20 is a configuration block diagram of a motor drive system according to the second embodiment. The motor drive system according to the second embodiment includes a motor 1, a PWM inverter 2, and a motor control device 3a. The motor control device 3a (and the motor drive system) according to the second embodiment includes, instead of the speed estimator 20 provided in the motor control device 3 (and the motor drive system) shown in FIG. 4, a speed estimator 20a. In other respects, the motor control device 3a (and the motor drive system) according to the second embodiment is the same as the motor control device 3 (and the motor drive system) shown in FIG. 4. Therefore, no overlapping description of the common features will be repeated. In the second embodiment, the motor 1 is a salient-pole motor (a motor having a salient pole) as exemplified by an interior permanent magnet synchronous motor. The different parts constituting the motor control device 3a can freely use all the values produced within the motor control device 3a as necessary.

Figure 21:
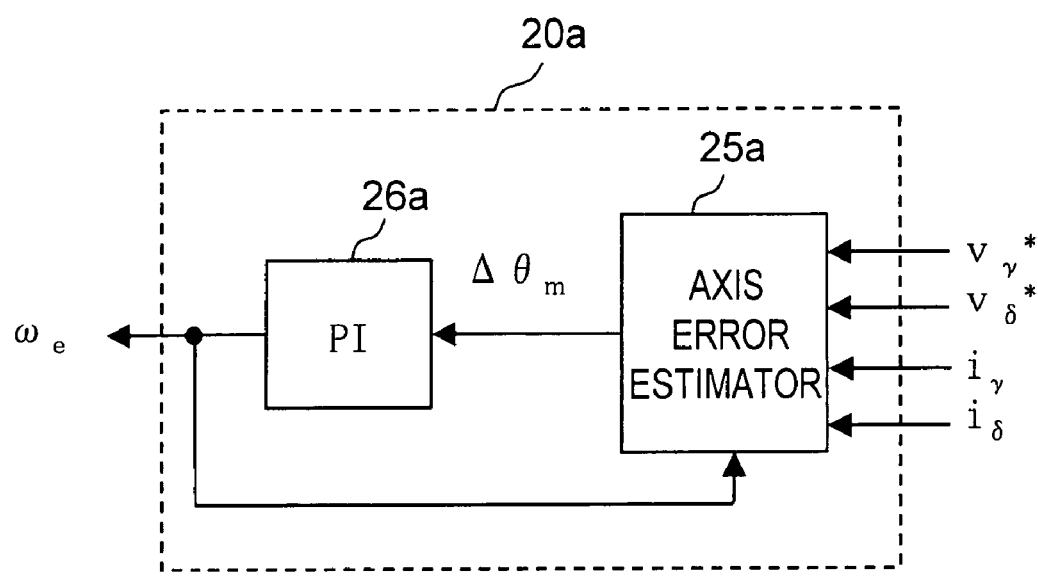
FIG. 21 is an internal block diagram of the speed estimator shown in FIG. 20.

FIG. 21 is an internal block diagram of the speed estimator 20a shown in FIG. 20. The speed estimator 20a includes an axis error estimator 25a and a proportional-plus-integral calculator 26a.

The axis error estimator 25a calculates the axis error $\Delta\theta_m$ based on all or part of $v_\gamma^*$, $v_\delta^*$, $i_\gamma$, and $i_\delta$. To achieve PLL (phase locked loop), the proportional-plus-integral calculator 26a performs proportional-plus-integral control to calculate the estimated motor speed $\omega_e$ such that the axis error $\Delta\theta_m$ calculated by the axis error estimator 25a converges to zero. Various methods for estimating the axis error $\Delta\theta_m$ can be adopted to make the axis error estimator 25a estimate the axis error $\Delta\theta_m$. It should be noted that, when using any formula stated in the present specification, the axis error estimator 25a substitutes the values of $v_{65}^*$, $v_\delta^*$, and $\omega_e$ for the values of $v_\gamma$, $v_\delta$, and $\omega$ whenever they appear in the formula.

For example, the axis error estimator 25a calculates the axis error $\Delta\theta_m$ according to formula (41) below. The $\gamma$-axis and $\delta$-axis components of the induction voltage vector $E_{exm}$ are represented by $E_{exm\gamma}$ and $E_{exm\delta}$ respectively. Then, as will be clear from FIG. 18, $\Delta\theta_m = \tan^{-1}(-E_{exm\gamma}/E_{exm\delta})$ holds. Using a rearranged form of the first and second lines of formula (38) (a determinant), $\Delta\theta_m$ is given by formula (41) below (assuming that the third term in the right side of formula (38) is ignored). In formula (41), eventually, on the assumption that $\Delta\theta_m$ is small, an approximation is made such that $\tan^{-1}(-E_{exm\gamma}/E_{exm\delta}) \approx (-E_{exm\gamma}/E_{exm\delta})$.

$$\Delta\theta_m = \tan^{-1}\frac{-E_{exm\gamma}}{E_{exm\delta}} \quad (41)$$
$$= \tan^{-1}\frac{-(v_\gamma - (R_a + pL_d)i_\gamma + \omega L_m i_\delta)}{v_\delta - (R_a + pL_d)i_\delta - \omega L_m i_\gamma}$$
$$\approx -\frac{v_\gamma - (R_a + pL_d)i_\gamma + \omega L_m i_\delta}{v_\delta - (R_a + pL_d)i_\delta - \omega L_m i_\gamma}$$

When calculating $\Delta\theta_m$ according to formula (41), the axis error estimator 25a can ignore the differentiation terms $pL_d i_\gamma$ and $pL_d i_\delta$. Moreover, to calculate the value of $L_m$ needed to calculate $\Delta\theta_m$, the axis error estimator 25a uses formula (42) below. Formula (42) is obtained by substituting $i_{dm}=0$ and formulae (43) and (44) below in formula (32) above, and then solving the resulting formula for $L_{q1}$.

$$L_m = L_q + L_{q1} \quad (42)$$
$$= L_q + \frac{i_d\{\Phi_a + (L_d - L_q)i_d\}}{i_d^2 + i_q^2}$$

$$i_{qm} = \sqrt{i_d^2 + i_q^2} \quad (43)$$

$$\sin\theta_m = \frac{i_d}{\sqrt{i_d^2 + i_q^2}} \quad (44)$$

Rearranging formula (42) above using formula (45), which gives the d-axis current $i_d$ that achieves maximum torque control, and formula (43), which gives (an approximation of) the relationship among $i_d$, $i_q$, and $i_{qm}$, gives $L_m$ as a function of $i_{qm}$ (i.e., the terms of $i_d$ and $i_q$ are eliminated from the calculation formula of $L_m$). Hence, assuming that $i_\delta \approx i_{qm}$, the axis error estimator 25a can calculate, based on $i_\delta$, the value of $L_m$ given as a function of $i_{qm}$. Then, based on the $L_m$ thus calculated, the axis error $\Delta\theta_m$ is calculated according to formula (41).

$$i_d = \frac{\Phi_a}{2(L_q - L_d)} - \sqrt{\frac{\Phi_a^2}{4(L_q - L_d)^2} + i_q^2} \quad (45)$$

Alternatively, the value of $L_m$ may be calculated by assuming that is $i_\delta \approx i_{qm}$ and using an approximation formula that gives $L_m$ as a function of $i_\delta$; or different values of $L_m$ corresponding to different values of $i_\delta$ may be previously prepared in the form of table data so that the value of $L_m$ is determined by referring to the table data. The value of $L_m$ may be fixed; that is, $L_m$ may be given a value that remains fixed irrespective of the value of $i_\delta$.

Alternatively, the axis error estimator 25a can calculate the axis error $\Delta\theta_m$ according to formula (46), (47), or (48) below. The value of $E_{exm}$ in formula (46) can be calculated according to formula (39) above. To calculate the value of $E_{exm}$, an approximation can be made as appropriate. The symbols $\Phi_{exm\gamma}$ and $\Phi_{exm\delta}$ respectively represent $\gamma$-axis and $\delta$-axis components of the flux linkage vector $\Phi_{exm}$.

$$\Delta\theta_m = \sin^{-1}\left(\frac{-E_{exm\gamma}}{E_{exm}}\right) \quad (46)$$
$$= \sin^{-1}\frac{-(v_\gamma - (R_a + pL_d)i_\gamma + \omega L_m i_\delta)}{E_{exm}}$$
$$\approx \frac{v_\gamma - (R_a + pL_d)i_\gamma + \omega L_m i_\delta}{E_{exm}}$$

$$\Delta\theta_m = \tan^{-1}\frac{-\Phi_{exm\delta}}{\Phi_{exm\gamma}} = \tan^{-1}\left(\frac{\frac{-E_{exm\gamma}}{\omega}}{\frac{E_{exm\delta}}{\omega}}\right) \quad (47)$$

$$\Delta\theta_m = \sin^{-1}\left(\frac{-\Phi_{exm\delta}}{\Phi_{exm}}\right) = \sin^{-1}\left(\frac{\frac{-E_{exm\gamma}}{\omega}}{\frac{E_{exm}}{\omega}}\right) \quad (48)$$

In the motor control device 3a shown in FIG. 20, the magnetic flux controller 16, like the magnetic flux controller 16 shown in FIG. 4, produces and outputs the specified $\gamma$-axis current value (specified excitation current value) $i_\gamma^*$ given by formulae (2), (3a), and (3b). In addition, like the magnetic flux controller 16 shown in FIG. 4, the magnetic flux controller 16 provided in the motor control device 3a can change the value of n, the phase $\alpha$, and (or) the gain A according to the speed information indicating the rotation speed of the rotor.

This makes it possible to achieve the same effects as those achieved in the first embodiment.

MODIFICATIONS AND VARIATIONS

It is to be understood, however, that the motor drive system specifically described above is given merely as an example, and, in implementing the present invention, many modifications and variations are possible. The motor drive system of the invention may be modified as follows. Any feature of modified examples 1 to 6 described below can be applied, unless inconsistent, to any modified example other than that in connection with which the feature is specifically described.

Modified Example 1

In the motor drive system shown in FIG. 4, the motor speed ω and the rotor position θ are estimated. Instead, they may be detected by using a resolver (unillustrated) or the like. In this case, the magnetic flux controller 16 shown in FIG. 4 produces the specified γ-axis current value $i_\gamma^*$ as the specified excitation current value by using the detected real rotor position θ and real motor speed ω as $θ_e$ and $ω_e$, respectively. In that case, the γ-axis is not an estimated axis but (ideally) the d-axis itself.

Modified Example 2

The descriptions heretofore deal solely with cases in which the value of n in formula (2) fulfills $n=k_1/Np$ ($k_1$ is a natural number). However, the value of n may be given a value such as 1.1 or 2.3.

Modified Example 3

The first embodiment deals with a case in which the magnetic flux controller 16 outputs $i_\gamma^*$ itself given by formulae (2), (3a), and (3b). However, it is also possible to superpose the specified γ-axis current value $i_\gamma^*$ given by formulae (2), (3a), and (3b) on a basic specified γ-axis current value calculated to achieve desired vector control. In this case, the specified γ-axis current value $i_\gamma^*$ given by formulae (2), (3a), and (3b) serves as a superposition specified γ-axis current value for reducing the vibration.

For example, the magnetic flux controller 16 calculates the value of the right side of formula (4) above as the basic specified γ-axis current value, and calculates $i_\gamma^*$ given by formulae (2), (3a), and (3b) as the superposition specified γ-axis current value. Then, the magnetic flux controller 16 feeds the sum of the basic specified γ-axis current value and the superposition specified γ-axis current value to the subtracter 13 as a specified γ-axis current value (specified excitation current value) to be finally outputted by the magnetic flux controller 16. In this case, the subtracter 13 outputs, to the current controller 15, the current error between the specified γ-axis current value (i.e., the sum of the basic specified γ-axis current value and the superposition specified γ-axis current value) and the γ-axis current $i_\gamma$.

Modified Example 4

What has been described above presupposes that the second embodiment aims to achieve maximum torque control (or control similar to it). However, it is also possible to achieve any other desired vector control than maximum torque control by exploiting the features specifically described above.

For example, in the second embodiment, the rotation axis which leads in phase the rotation axis whose direction coincides with that of the current vector to be fed to the motor 1 to achieve maximum torque control is adopted as the qm-axis. This helps reduce iron loss, and thereby improve the efficiency of the motor. Giving an appropriate phase lead to the qm-axis helps achieve maximum efficiency control.

To achieve maximum torque control, the value of $L_m$ is calculated according to formula (42) above; to improve the efficiency of the motor, a value smaller than the value actually calculated according to formula (42) above is adopted as the value of $L_m$.

Modified Example 5

As shown in FIG. 4 or the like, the current detector 11 may be so configured as to directly detect the motor current. Alternatively, the current detector 11 may be so configured as to detect the motor current by reproducing the motor current from the instantaneous current of the direct current on the power supply side.

Modified Example 6

In each embodiment, part or all of the functions of the motor control device is realized, for example, with software (a program) incorporated in a general-purpose microcomputer or the like. When the motor control device is realized with software, the block diagrams showing the configurations of different parts of the motor control device serve as functional block diagrams. Needless to say, the motor control device may be realized with hardware alone, instead of software (a program).

Notes

In each embodiment, the coordinate converters 12 and 18, the subtracters 13 and 14, and the current controller 15 constitute a specified voltage value calculator. The magnetic flux controller 16, the speed controller 17, and the subtracter 19 constitute a specified current value calculator. The specified γ-axis current value outputted from the magnetic flux controller 16 corresponds to the specified excitation current value (the specified current value corresponding to the d-axis current).

In the present specification, to make the description simple, state quantities and the like are often referred to by their symbols (such as $i_\gamma$) alone; for example, the "γ-axis current $i_\gamma$" is sometimes referred to simply by "$i_\gamma$", and these should be understood to represent the same thing.

The present invention is suitable for electric devices of any kind that use a motor; for example, it is suitable for electric cars that run by exploiting the rotation of a motor, and compressors and the like used in air conditioners and the like.

Any of the different specified values ($i_\gamma^*$, $i_\delta^*$, $v_\gamma^*$, $v_\delta^*$, etc.) and other state quantities (such as $ω_e$) mentioned above, that is, any value that needs to be derived (or estimated) as necessary may be derived (or estimated) in any manner. That is, such values may be derived (or estimated), for example, through calculation performed within the motor control device (3, 3a, etc.), or may be derived (or estimated) from a previously set table data.

What is claimed is:
1. A motor control device,
wherein the motor control device controls a motor built with a rotor having a permanent magnet and a stator having an armature winding, wherein, let an axis parallel to a magnetic flux produced by the permanent magnet be called a d-axis, then the motor control device comprises:

a magnetic flux controller that derives, as a specified excitation current value, a specified current value corresponding to a d-axis component of a current passing through the armature winding; and a current controller that controls, based on the specified excitation current value, the current passing through the armature winding, the magnetic flux controller makes the specified excitation current value vary periodically, based on an estimated or detected rotor position, in a current range in which the magnetic flux is weakened, and changes the specified excitation current value according to a rotation speed of the rotor, wherein the specified excitation current value is varied at a speed $k_1$ times of the rotation speed of the rotor, and wherein $k_1$ is a natural number.

2. The motor control device of claim 1, wherein, when the rotation speed is fixed at a given first rotation speed or a given second rotation speed different from the first rotation speed, the magnetic flux controller makes the specified excitation current value vary at a frequency proportional to the rotation speed, wherein, the magnetic flux controller is so configured as to change a proportionality coefficient between the frequency and the rotation speed depending on whether the rotation speed is the first rotation speed or the second rotation speed.

3. The motor control device of claim 1, wherein the magnetic flux controller is so configured as to change a phase of variations in the specified excitation current value according to the rotation speed.

4. The motor control device of claim 1, wherein the magnetic flux controller is so configured as to change an amplitude of variations in the specified excitation current value according to the rotation speed.

5. The motor control device of claim 2, wherein a plurality of possible proportionality coefficients are set for the proportionality coefficient, wherein the proportionality coefficient is determined based on vibration states of an apparatus incorporating the motor control device, the vibration states as observed when the plurality of possible proportionality coefficients are individually adopted as the proportionality coefficient.

6. The motor control device of claim 3, wherein a plurality of possible phases are set for the phase, wherein the phase is determined based on vibration states of an apparatus incorporating the motor control device, the vibration states being vibration levels of the apparatus when the plurality of possible phases are individually adopted as the phase.

7. A motor drive system comprising:

a motor;

an inverter that drives the motor; and the motor control device of claim 1, the motor control device that controls the motor by controlling the inverter.

8. The motor drive system of claim 7, wherein the motor drive system is used in a horizontal compressor.

9. A motor control device, wherein the motor control device controls a motor built with a rotor having a permanent magnet and a stator having an armature winding, wherein, let an axis parallel to a magnetic flux produced by the permanent magnet be called a d-axis, then the motor control device comprises:

a magnetic flux controller that derives, as a specified excitation current value, a specified current value corresponding to a d-axis component of a current passing through the armature winding; and a current controller that controls, based on the specified excitation current value, the current passing through the armature winding, the magnetic flux controller makes the specified excitation current value vary periodically, based on an estimated or detected rotor position, in a current range in which the magnetic flux is weakened, and changes the specified excitation current value according to a rotation speed of the rotor, wherein, when the rotation speed is fixed at a given first rotation speed or a given second rotation speed different from the first rotation speed, the magnetic flux controller makes the specified excitation current value vary at a frequency proportional to the rotation speed, wherein, the magnetic flux controller is so configured as to change a proportionality coefficient between the frequency and the rotation speed depending on whether the rotation speed is the first rotation speed or the second rotation speed.

10. The motor control device of claim 9, wherein a plurality of possible proportionality coefficients are set for the proportionality coefficient, wherein the proportionality coefficient is determined based on vibration states of an apparatus incorporating the motor control device, the vibration states as observed when the plurality of possible proportionality coefficients are individually adopted as the proportionality coefficient.

* * * * *